(12) United States Patent
Lo et al.

(10) Patent No.: US 9,282,354 B2
(45) Date of Patent: Mar. 8, 2016

(54) METHOD AND APPARATUS TO DETECT A DEMAND FOR AND TO ESTABLISH DEMAND-BASED MULTIMEDIA BROADCAST MULTICAST SERVICE

(71) Applicant: QUALCOMM Incorporated, San Diego, CA (US)

(72) Inventors: Charles Nung Lo, San Diego, CA (US); Michael G Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/661,003

(22) Filed: Oct. 25, 2012

(65) Prior Publication Data

US 2013/0111520 A1  May 2, 2013

Related U.S. Application Data

(60) Provisional application No. 61/553,151, filed on Oct. 28, 2011.

(51) Int. Cl.
*H04N 7/16* (2011.01)
*H04N 21/258* (2011.01)
(Continued)

(52) U.S. Cl.
CPC .... *H04N 21/25841* (2013.01); *H04L 29/06326* (2013.01); *H04L 29/06523* (2013.01);
(Continued)

(58) Field of Classification Search
CPC .................. H04N 21/25841; H04N 21/44204; H04N 5/765; H04N 21/26616
USPC .................................... 725/32–36, 62, 86–87
See application file for complete search history.

(56) References Cited

U.S. PATENT DOCUMENTS 8,069,010 B2  11/2011  Choi et al.
8,155,580 B2  4/2012  Maggenti et al.
(Continued)

FOREIGN PATENT DOCUMENTS

EP  1213874 A2  6/2002
JP  2005521299 A  7/2005
(Continued)

OTHER PUBLICATIONS

3rd Generation Partnership Project (3GPP), 3GPP Standard; 3GPP TS 25.346, "3rd Generation Partnership Project, Technical Specification Group Radio Access Network; Introduction of the Multimedia Broadcast/Multicast Service (MBMS) in the Radio Access Network (RAN); Stage 2 ( Release 10)", Mobile Competence Centre, 650, Route Des Lucioles, F-06921 Sophia-Antipolis Valbonne, France, No. V10.0.0 Mar. 15, 2011, pp. 1-71, XP050476327A, [retrieved on Mar. 15, 2011].
(Continued)

*Primary Examiner* — Pankaj Kumar
*Assistant Examiner* — Alazar Tilahun
(74) *Attorney, Agent, or Firm* — Novak Druce Connolly Bove + Quigg

(57) ABSTRACT

Techniques are provided for content delivery via on-demand mobile broadcast service. For example, there is provided a method operable by a network entity, such as a Broadcast-Multicast Service Center (BM-SC), that may involve receiving a request for content, and performing predictive analysis of at least one of the requested content or user information to target content to at least two user equipments (UEs) in a coverage area. The method may involve providing at least one of the requested content or the targeted content via an on-demand mobile broadcast service. The targeted content may include at least one of supplemental content related to the requested content or targeted advertising.

23 Claims, 20 Drawing Sheets

(51) Int. Cl.

| | | |
|---|---|---|
| *H04N 21/61* | (2011.01) | |
| *H04W 4/06* | (2009.01) | |
| *H04W 4/08* | (2009.01) | |
| *H04W 76/00* | (2009.01) | |
| *H04L 29/08* | (2006.01) | |
| *H04L 29/06* | (2006.01) | |
| *H04W 28/08* | (2009.01) | |

(52) U.S. Cl.
CPC ............ *H04L67/306* (2013.01); *H04L 67/325* (2013.01); *H04N 21/61* (2013.01); *H04W 4/06* (2013.01); *H04W 4/08* (2013.01); *H04W 76/002* (2013.01); *H04W 28/08* (2013.01)

(56) References Cited

U.S. PATENT DOCUMENTS

| | | | |
|---|---|---|---|
| 8,171,032 B2 | 5/2012 | Herz | |
| 8,490,124 B2 | 7/2013 | Michael et al. | |
| 2002/0123928 A1* | 9/2002 | Eldering et al. | 705/14 |
| 2003/0208754 A1* | 11/2003 | Sridhar et al. | 725/34 |
| 2004/0128688 A1* | 7/2004 | Seo | 725/62 |
| 2006/0245441 A1 | 11/2006 | Chen et al. | |
| 2007/0094691 A1* | 4/2007 | Gazdzinski | 725/62 |
| 2009/0150943 A1* | 6/2009 | Vasudevan et al. | 725/86 |
| 2009/0193485 A1* | 7/2009 | Rieger et al. | 725/114 |
| 2009/0254930 A1* | 10/2009 | Lo et al. | 725/2 |
| 2010/0057560 A1 | 3/2010 | Skudlark et al. | |
| 2010/0151882 A1 | 6/2010 | Gillies et al. | |
| 2011/0082807 A1 | 4/2011 | Parekh et al. | |
| 2012/0191815 A1 | 7/2012 | Tabbal et al. | |
| 2013/0031210 A1* | 1/2013 | Redmond | 709/218 |

FOREIGN PATENT DOCUMENTS

| | | |
|---|---|---|
| JP | 2011520303 A | 7/2011 |
| KR | 20100036063 A | 4/2010 |
| WO | 03079655 A1 | 9/2003 |
| WO | 2007149821 | 12/2007 |
| WO | 2009086153 A2 | 7/2009 |
| WO | 2009148948 | 12/2009 |
| WO | 2011006889 A1 | 1/2011 |
| WO | 2011015252 A1 | 2/2011 |
| WO | 2011054377 A1 | 5/2011 |

OTHER PUBLICATIONS

3rd Generation Partnership Project (3GPP), Philips, "On the issue of switching between P2P and P2MP-channels in MBMS", 3GPP Draft; R2-030078 On the Issue of Switching Between P2P and P2MP in MBMS, Mobile Competence Centre, 650, Route Des Lucioles; F-06921 Sophia-Antipolis Cedex; France. vol. RAN WG2, No. UK; Jan. 13, 2003, XP050141520, [retrieved on Jan. 13, 2003].

NEC: "DISC on MBMS service activation/deactivation further to counting", 3GPP Draft; R2-106488, 3rd Generation Partnership Project (3GPP), Mobile Competence Centre ; 650, Route Des Lucioles; F-06921 Sophia-Antipolis Cedex; France, vol. RAN WG2, no. Jacksonville, USA, Nov. 8, 2010, XP050466202, [retrieved on Nov. 8, 2010].

Partial International Search Report—PCT/US2012/062242—ISA/EPO—Apr. 15, 2013.

3GPP: "3rd Generation Partnership Project; Technical Specification Group Services and System Aspects; Improved Video Coding Support (Release 10)", 3GPP Draft; S4-110321 TR26904 V110 Revmark for TSGSA, 3rd Generation Partnership Project (3GPP), Mobile Competence Centre ; 650, Route Des Lucioles ; F-06921 Sophia-Antipolis Cedex ; France, vol. SA WG4, no. Sanya, China; Feb. 14, 2011, Feb. 17, 2011, XP050527790.

International Search Report and Written Opinion—PCT/US2012/062242—ISA/EPO—Sep. 12, 2013.

Xuan P. et al., "Broadcast on demand: efficient and timely dissemination of data in mobile environments", Proceedings Real-Time Technology and Applications Symposium, Third IEEE Montreal, QUE, Canada Jun. 9-11, 1997, Los Alamitos, CA, USA,IEEE Comput. Soc, US, Jun. 9, 1997, pp. 38-48, XP010232463, DOI: 10.1109/RTTAS.1997.601342, ISBN: 978-0-8186-8016-8.

* cited by examiner

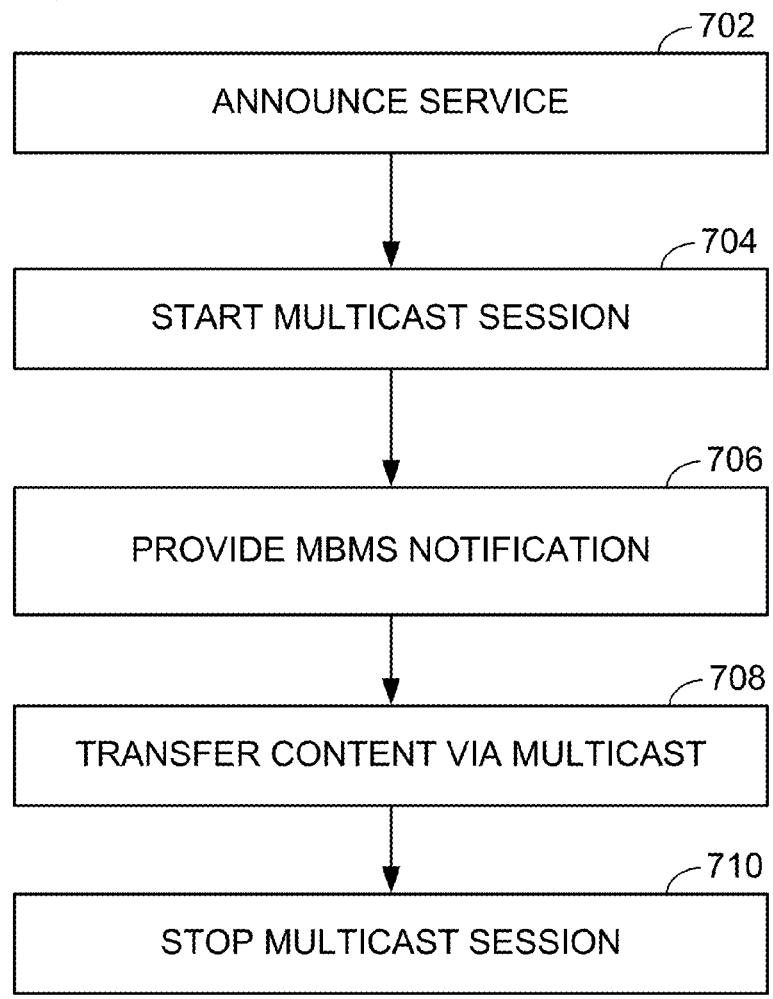
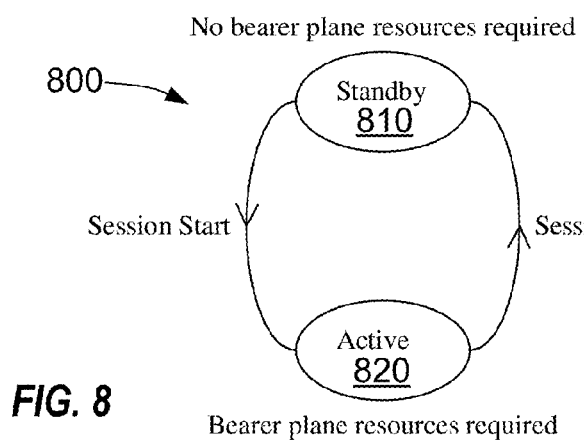

1400

1430
PROVIDING THE REQUESTED CONTENT VIA THE BROADCAST SERVICE, IN RESPONSE TO A GROUP INTEREST IN THE REQUESTED CONTENT EXCEEDING A THRESHOLD INTEREST LEVEL

1432
PROVIDING THE TARGETED CONTENT VIA THE BROADCAST SERVICE, IN RESPONSE TO A GROUP INTEREST IN THE TARGETED CONTENT EXCEEDING A THRESHOLD INTEREST LEVEL

1440
THE USER INFORMATION MAY INCLUDE AT LEAST ONE OF USER LOCATION OR USER PROFILE DATA

1442
THE USER PROFILE DATA MAY INCLUDE AT LEAST ONE OF PAST USAGE BEHAVIOR, DEMOGRAPHICS INFORMATION, USER PREFERENCE SETTINGS, OR A PROFILE-ID

1450
THE TARGETED CONTENT MAY COMPRISE SUPPLEMENTAL CONTENT RELATED TO THE REQUESTED CONTENT, TARGETED ADVERTISING, COUPONS, PROMOTIONS, USER-LOCATION BASED ALERTS AND/OR NOTIFICATIONS

1460
INITIALLY OPERATING IN UNICAST MODE OF OPERATION

1462
SWITCHING FROM A UNICAST MODE OF OPERATION, IN RESPONSE TO A GROUP INTEREST IN THE IDENTIFIED CONTENT EXCEEDING A THRESHOLD INTEREST LEVEL

*FIG. 14B*

METHOD AND APPARATUS TO DETECT A DEMAND FOR AND TO ESTABLISH DEMAND-BASED MULTIMEDIA BROADCAST MULTICAST SERVICE

CROSS-REFERENCE TO RELATED APPLICATION

The present Application for patent claims priority to Provisional Application No. 61/553,151, filed Oct. 28, 2011, entitled "METHOD AND APPARATUS TO DETECT A DEMAND FOR AND TO ESTABLISH DEMAND-BASED MULTIMEDIA BROADCAST MULTICAST SERVICE", which is assigned to the assignee hereof and is hereby expressly incorporated in its entirety by reference herein.

BACKGROUND

1. Field

Aspects of the present disclosure relate generally to wireless communication systems, and more particularly, to the adaptive delivery of content to wireless devices.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling. In this context, there remains a need for 3GPP LTE technology that facilitates on-demand mobile broadcast services.

SUMMARY

Illustrative embodiments of the present invention that are shown in the drawings are summarized below. These and other embodiments are more fully described in the detailed description section. It is to be understood, however, that there is no intention to limit the invention to the forms described in this Summary of the Invention or in the detailed description.

In accordance with one or more aspects of the embodiments described herein, there is provided a content delivery method operable by a network entity, such as, for example, a Broadcast-Multicast Service Center (BM-SC) device or the like. The method may involve receiving a request for content, and performing predictive analysis of at least one of the requested content or user information to target content to at least two user equipments (UEs) in a coverage area. The method may further involve providing at least one of the requested content or the targeted content via an on-demand mobile broadcast service. In related aspects, an electronic device (e.g., a BM-SC or component(s) thereof) may be configured to execute the above-described methodology.

In accordance with one or more aspects of the embodiments described herein, there is provided another content delivery method operable by a network entity. The method may involve determining requested content and user information for each UE in a given coverage area. The method may further involve identifying targeted content for at least two UEs based on at least one of the requested content or the user information. The method may also involve providing via a demand-based broadcast service the targeted content at a given resolution and a given data delivery rate based on at least one of the requested content, the user information, content provider policy, network provider policy, or media presentation description (MPD) defined capabilities. In related aspects, an electronic device (e.g., a BM-SC or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 7 illustrates an embodiment of a methodology for managing a multicast service in a wireless communications system.

FIG. 8 is a state diagram illustrating active and inactive states of a multicast session.

FIGS. 14A-B illustrate an example methodology executable by a network entity (e.g., BM-SC or the like) for on-demand broadcast content delivery.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
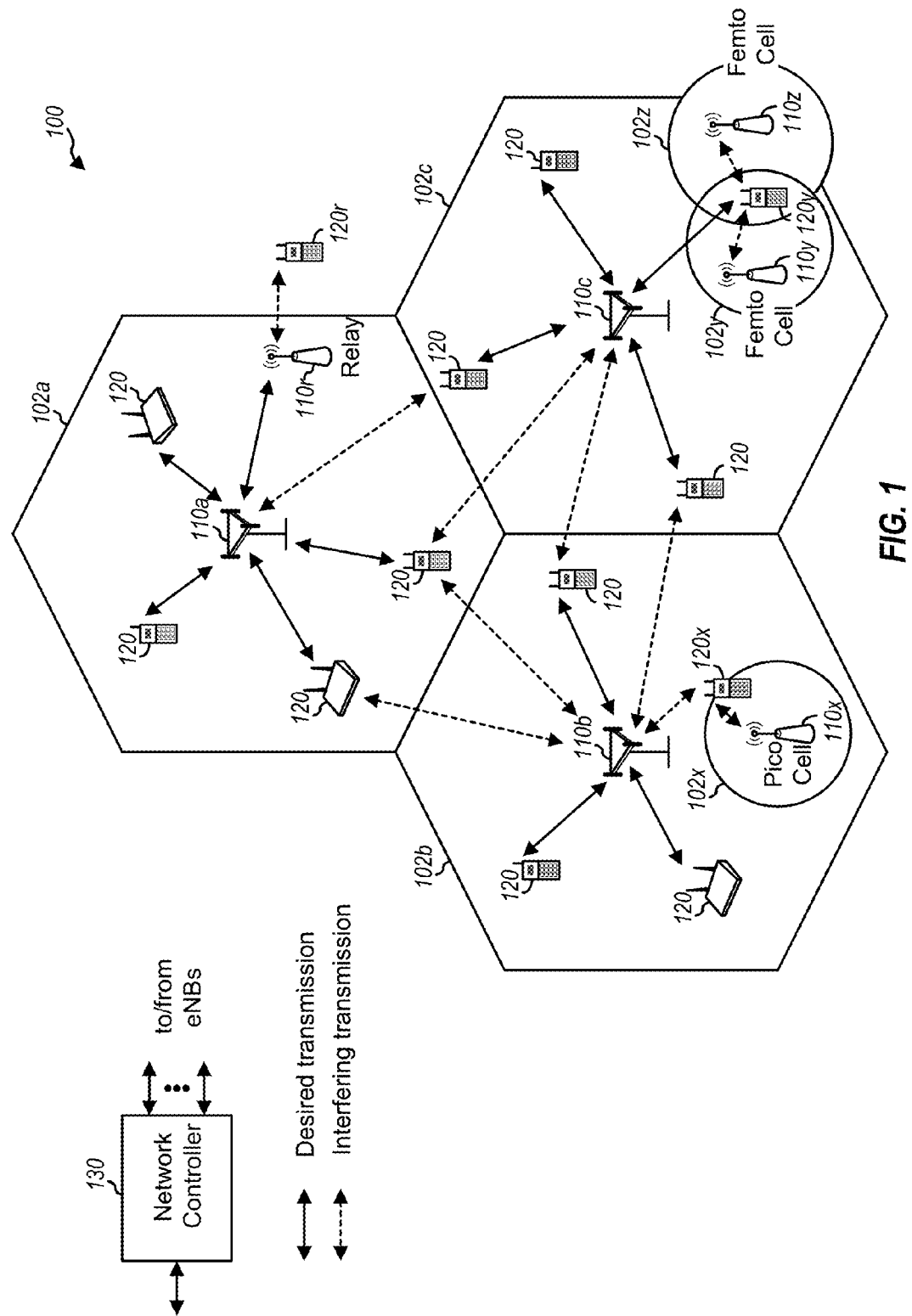
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, the relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 5 to 40 Watts) whereas pico eNBs, femto eNBs and relays may have a lower transmit power level (e.g., 0.1 to 2 Watts).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
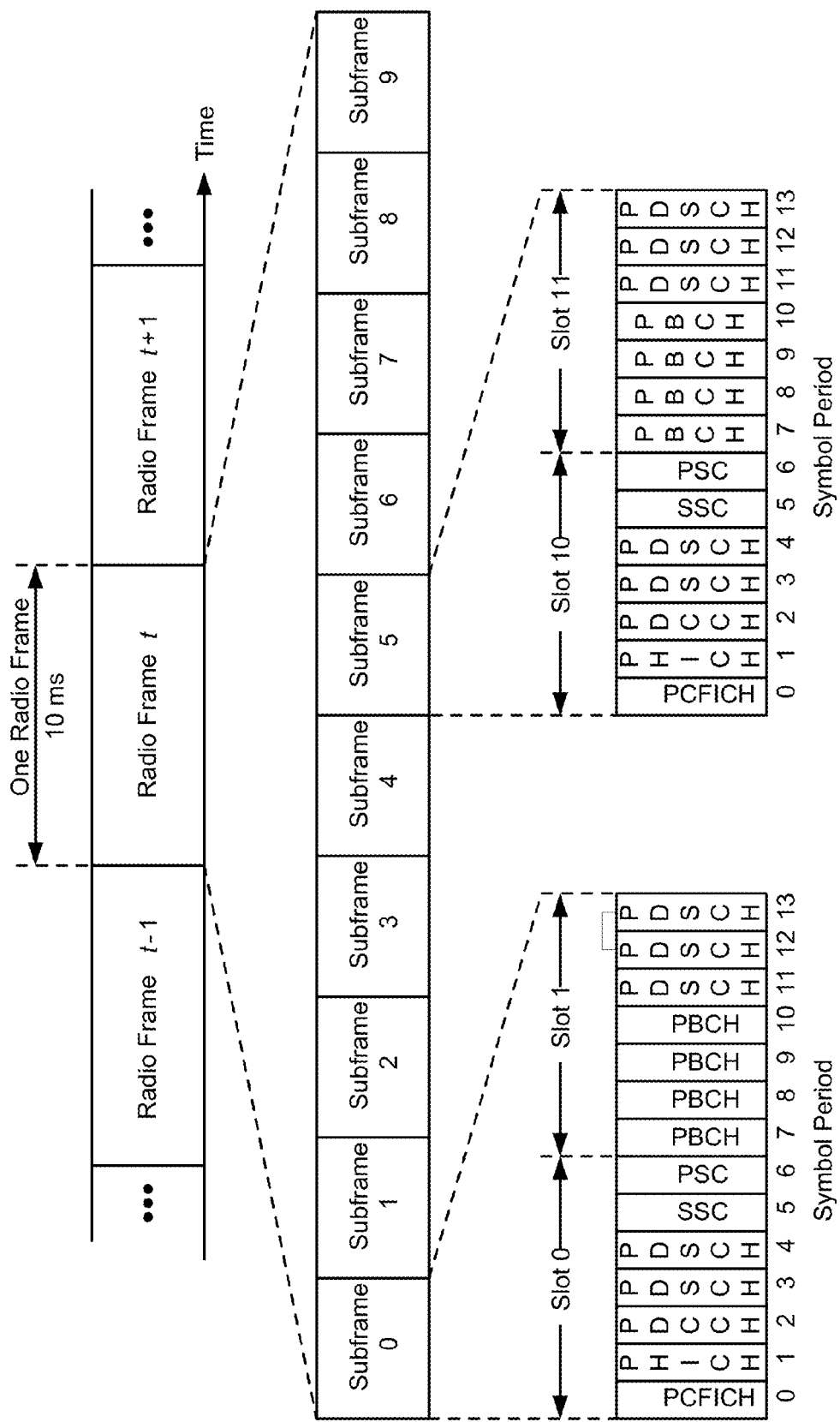
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) which may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
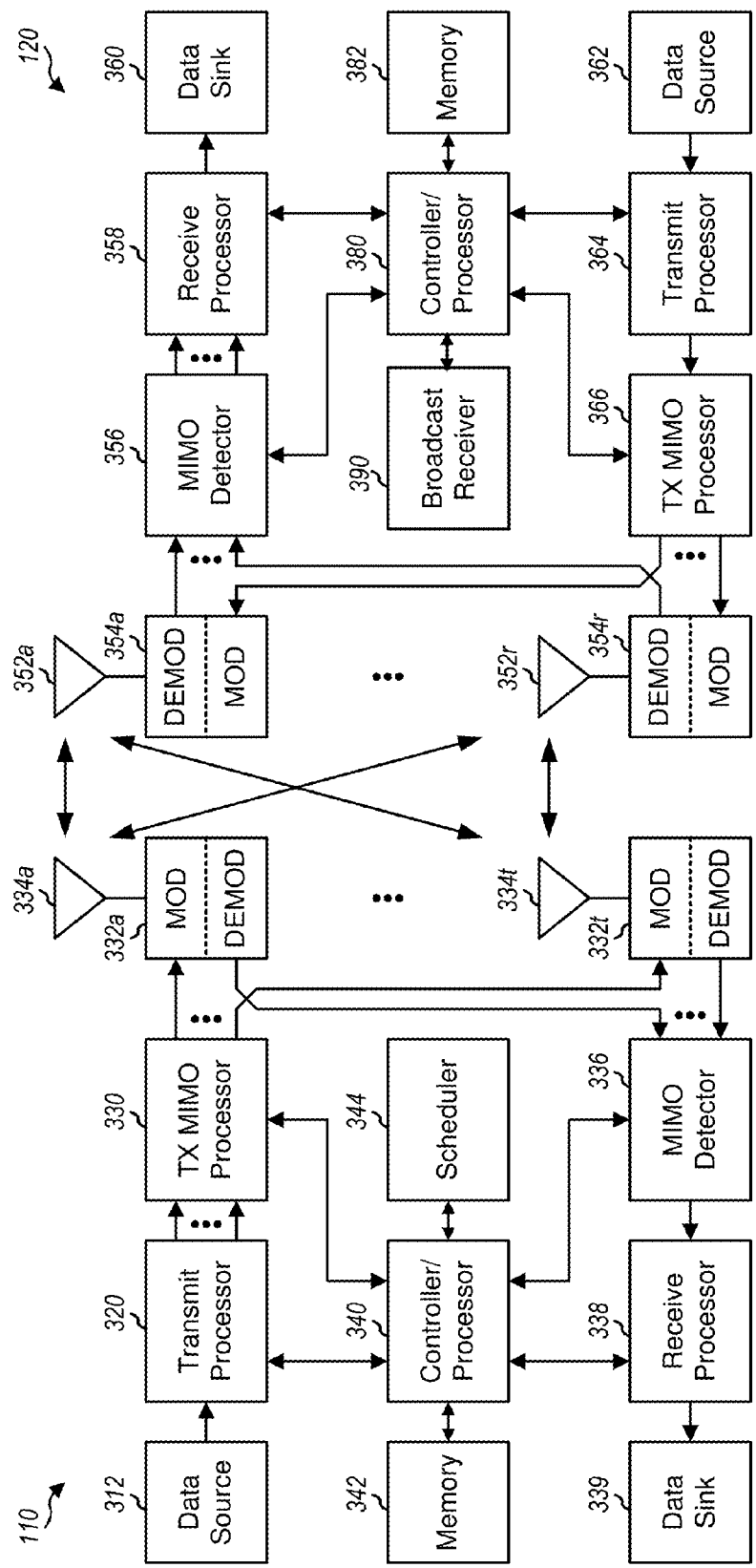
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. In related aspects, the UE 120 may include a broadcast receiver 390 for receiving targeted content via on-demand mobile broadcast service or the like, as explained in further detail below.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

eMBMS AND UNICAST SIGNALING IN SINGLE FREQUENCY NETWORKS: One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB (or eNBs) within radio range. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area or MBSFN area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect to a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design may allow six out of ten subframes for eMBMS.

Figure 4:
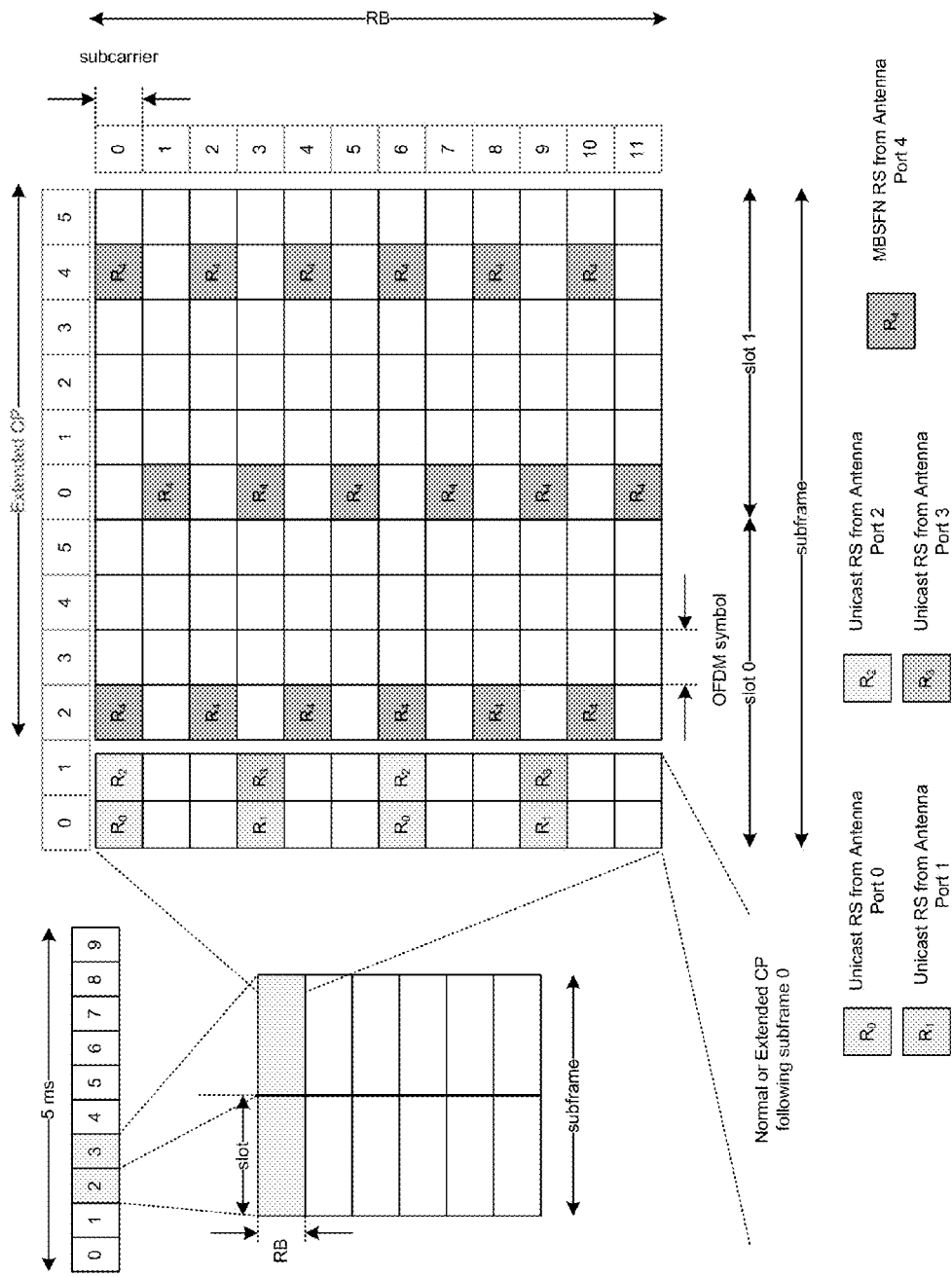
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes, for a single-carrier case. Components depicted in FIG. 4 correspond to those shown in FIG. 2, with FIG. 4 showing the individual subcarriers within each slot and resource block (RB). In 3GPP LTE, an RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

Figure 5:
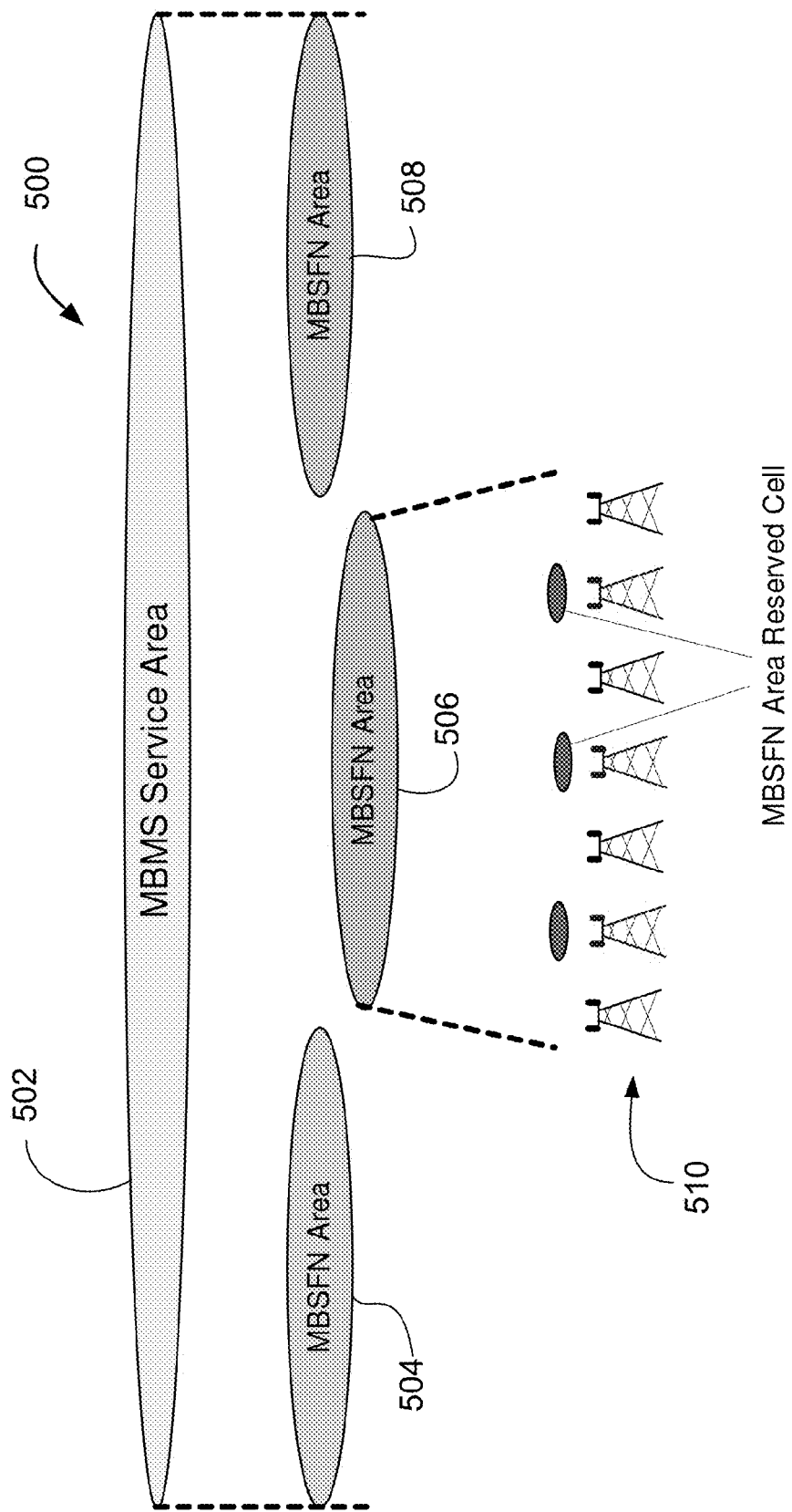
FIG. 5 is a diagram illustrating MBMS over a Single Frequency Network (MBSFN) areas within an MBSFN service area.
Figure 6A:
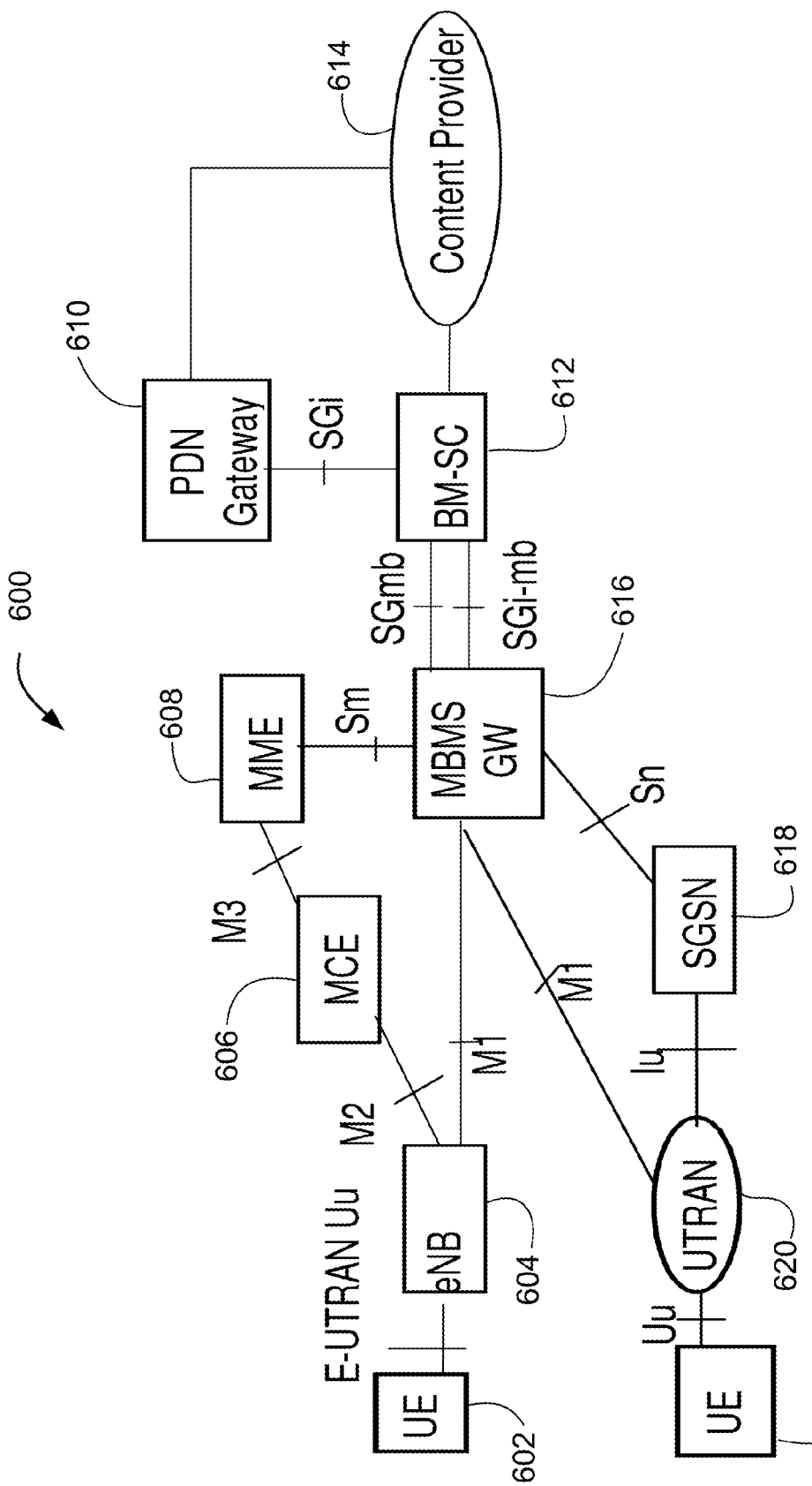
FIG. 6A is a block diagram illustrating components of a wireless communication system for providing or supporting MBSFN service.

With continued reference to FIG. 4, within each eMBMS subframe, the first 1 or 2 symbols may be used for unicast reference symbols (RSs) and control signaling. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe includes MBSFN RSs but not unicast RSs. The present technology is not limited to the particular frame allocation scheme illustrated by FIGS. 2 and 4, which are presented by way of example, and not by way of limitation. A multicast session or broadcast as used herein may use any suitable frame allocation scheme.

eMBMS SERVICE AREAS: FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS SYSTEM COMPONENTS AND FUNCTIONS: FIG. 6A illustrates functional entities of a wireless communication system 600 for providing or supporting MBSFN service. Regarding Quality of Service (QoS), the system 600 may use a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 600 may include an MBMS Gateway (MBMS GW) 616. The MBMS GW 616 controls Internet Protocol (IP) multicast distribution of MBMS user plane data to eNodeBs 604 via an M1 interface; one eNB 604 of many possible eNBs is shown. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a UE/mobile entity 602 via an E-UTRAN Uu interface. The RNC 620 may provide MBMS content to a UE mobile entity 622 via a Uu interface. The MBMS GW 616 may further perform MBMS Session Control Signaling, for example MBMS session start and session stop, via the Mobility Management Entity (MME) 608 and Sm interface. The MBMS GW 616 may further provide an interface for entities using MBMS bearers through the SGmb (user plane) reference point, and provide an interface for entities using MBMS bearers through the SGi-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function form MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604.

The system 600 may further include a Broadcast-Multicast Service Center (BM-SC) 612 in communication with a content provider server 614. The BM-SC 612 may be the network entity that handles intake of multicast content from one or more sources such as the content provider 614, and provides other higher-level management functions as described below. These functions may include, for example, a membership function, including authorization and initiation of MBMS services for an identified UE. The BM-SC 612 may further perform MBMS session and transmission functions, scheduling of live broadcasts, and delivery, including MBMS and associated delivery functions. The BM-SC 612 may further provide service advertisement and description, such as advertising content available for multicast.

Figure 6B:
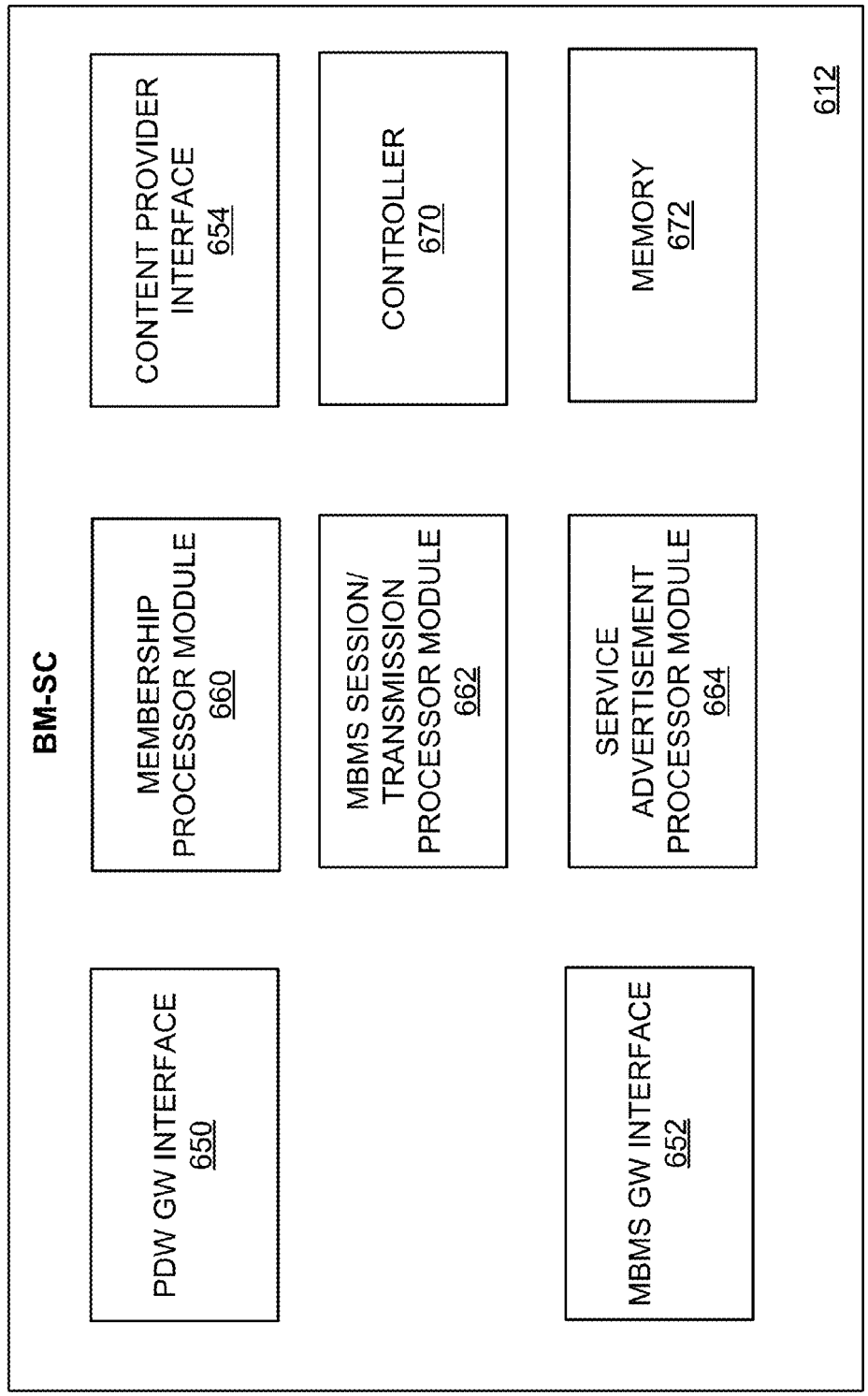
FIG. 6B shows aspects of an example BM-SC.

With reference to FIG. 6B, there is shown an example BM-SC device 612. The BM-SC 612 may include a PDW GW interface 650, an MBMS GW interface 652, and a content provider interface 654, each operatively coupled to a controller 670. The BM-SC 612 may include a membership processor module 660, an MBMS session/transmission processor module 662, and a service advertisement processor module 664, each operatively coupled to controller 670. The BM-SC 612 may include a memory 672 operatively coupled to controller 670. In related aspects, one or more of the membership processor module 660, the MBMS session/transmission processor module 662, the service advertisement processor module 664, or the controller 670 may be located on a given processor. In further related aspects, one or more of the membership processor module 660, the MBMS session/transmission processor module 662, the service advertisement processor module 664, or the controller 670 may be a separate processor residing in an application specific integrated circuit (ASIC) or the like.

With reference once again to FIG. 6A, a separate Packet Data Protocol (PDP) context may be used to carry control messages between a UE and BM-SC 612. The BM-SC 612 may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The Multicast Management Entity (MME) 608 may communicate with the MCE 606 and MBMS-GW 608. The MME 608 may provide a control plane function for MBMS over E-UTRAN. In addition, the MME may provide the eNB 604 and/or the UTRAN RNC 620 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

The system 600 may be used to transmit an eMBMS or other multicast session in an MBMS area. As shown in FIG. 7, a method 700 for handling an MBMS session may include an initial operation 702 of announcing or advertising availability of a scheduled service. An MBMS broadcast of a sporting event may be advertised in a specified area to begin at a certain date and time, for example, by using an Open Mobile Alliance (OMA) Mobile Broadcast Services Enabler Suite (BCAST) service guide. To obtain advertising service availability, users may subscribe to a message service, download a program guide or listing, or take some other action. In the alternative, advertising may be pushed to mobile entities without requiring any action from the user. A service announcement may include, for example, a service identifier, service area identifier, schedule, applicable IP multicast address(es), and other information.

At 704, the system may start a broadcast by initiating a broadcast transmission at the advertised date and time, within the specified broadcast area. For example, a BM-SC may initiate an MBMS broadcast using a session start procedure to establish an MBMS radio bearer.

At 706, the system may provide a notification of ongoing or forthcoming MBMS services to a mobile entity, such as, for example, by using an MCCH change notification transmitted to the mobile entity. At 708, the system transfers MBMS content for the advertised service to the mobile entity, using the established MBMS radio bearer. At 710, once the eMBMS broadcast is completed, the system stops the broadcast session and releases its associated radio bearer.

An MBMS bearer context may be created in the MME, MBMS GW, SGN and other elements of a Radio Access Network (RAN) upon initiation of an MBMS session. FIG. 8 illustrates a state cycle 800 between an active session state 820 and a standby state 810 of an MBMS bearer context. While in the standby state 810, the BM-SC may start the session and enter the active session state 820, wherein the bearer place resources may be required. While in the active session state 820, the BM-SC may stop the session and return to the standby state 810, where no bearer plane resources are required. The MBMS bearer context itself may include an MBMS GW Tunnel Endpoint ID for Control plane (TEID-C) and a Temporary Mobile Group Identity (TMGI). A unique TMGI per MBMS bearer service may be allocated by the BM-SC, and used for MBMS notification purpose.

ON-DEMAND MOBILE BROADCAST SERVICE: Traditional unicast content delivery may not be sufficient to meet the demand of users in a given high demand area. As such, an improved unicast content delivery, as well as on-demand broadcast substitution for queue-based unicast content downloading using location, profiling, and/or prediction, may be beneficial for meeting high demands for content in the given area. It is possible to employ Over-the-Top (OTT) download delivery of contents such as User-Generated Content (UGC) video clips, TV catch-up episodes, and movies, to mobile devices over cellular networks. In some of these systems, end-user requests for content are queued at the mobile device, for deferred download reception over unicast cellular networks. It may also be possible in these systems for the device to additionally receive content deemed suitable for future consumption, for example based on knowledge of user's consumption history/behavior, some explicit user preference in a user profile or based on device capability. In the event that multiple users located in proximity to one another are requesting the same content(s), or may share common interest in receiving some other content(s), it could be advantageous to activate on-demand broadcast delivery of those contents. Doing so would reduce the unicast traffic load for serving those users, while enabling a new, e.g., on-demand based service model for broadcast multicast content delivery.

In accordance with one or more aspects of the embodiments described herein, there is provided a mobile/cellular broadcast/download delivery system. In related aspects, a given number of users may be located within a certain proximity to one another, and may be making requests for delivery to their UEs, the same content/program, and furthermore may have similar interest in the type(s) of sought contents. In further related aspects, besides providing the requested content items, the system may deliver for storage on the UE, additional contents predicted to be of likely interest for future consumption. In yet further related aspects, there is a mobile broadcast system deployed by the mobile network operator in the same region that the above users are located, and has the capability and capacity to support on-demand establishment of content transmission.

Without on-demand mobile broadcast delivery, a multiplicity of unicast download delivery sessions may result in increased traffic load in the cellular network for the common region where the requesting users reside. A consequence of such network operation for end users may be limited throughput, such that the requested content cannot be delivered either at the desired (e.g., high) resolution, or in its entirety given a limited time window available for reception. Alternatively, it might not be possible for the additional predicted or recommended content to be delivered together with the requested content. Furthermore, network congestion may impact communication capability of other nearby cellular subscribers.

On the other hand, availability of on-demand mobile broadcast service operation in a common geographical area could offer a way to effectively offload the cellular unicast network traffic. In addition, dynamic broadcast service operation allows fuller utilization of spare capacity of the network. Broadcast-mode operation may cease when the network determines that an appropriate reduction in the confluence of location and/or user interests commonality among content requests exists.

Figure 9:
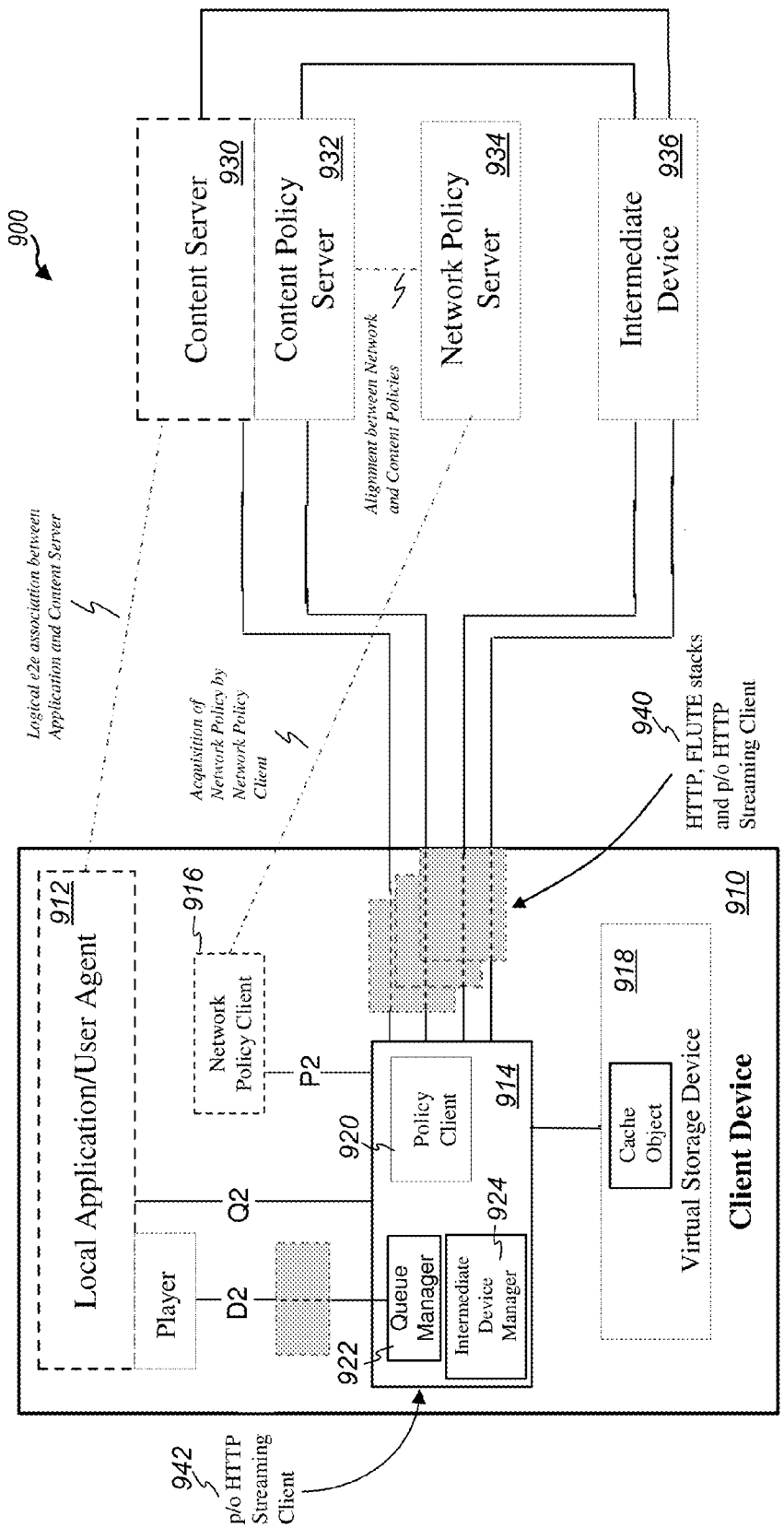
FIG. 9 illustrates an example of a P2200 architecture and components thereof.

An example of a mobile cellular based download delivery system is defined by IEEE P2200, also referred to herein as P2200. Content requests by a local application may be queued at a download delivery client on a UE. For example, in P2200, the content requests by the local applications may be queued at the UE's P2200 Client entity. Both unicast and broadcast delivery of requested contents are possible in P2200. With reference to FIG. 9, there is shown an example, P2200 architecture. It is noted that the solid boxes in FIG. 9 correspond to P2200 components having features defined in the P2200 standard. The dashed boxes in FIG. 9 correspond to external components with features that are not defined in the P2200 standard.

With reference to the architecture 900 of FIG. 9, in nominal operation, a queue request for a particular content (e.g., identified by Content-URI) may be submitted by the local application 912 and delivered to the download delivery client 914 (e.g., P2200 Client). The download delivery client 914 may include a policy client module 920, a queue manager 922, and an intermediate device manager 924. The download delivery client 914 may obtain any available content provider policy, network provider policy, and/or application policy information, to control the download execution of that request. For example, the download delivery client 914 may obtain such policy information (directly and/or via a network policy client 916) from one or more of a content server 930, a content policy server 932, network policy server 934, an intermediate device 936, or the like. The network policy client 916 may be in operative communication with the policy client 920 of the download delivery client 914, and may acquire the network policy (directly or indirectly) from the network policy server 934.

Upon meeting policy requirements, the download delivery client 914 may then execute the download by Hypertext Transfer Protocol (HTTP), and may store the acquired content item in local device storage 918 (e.g., virtual or physical storage device) for subsequent playback by the application. The downloaded content may arrive via HTTP or File Delivery over Unidirectional Transport (FLUTE) stacks and/or part of HTTP streaming clients 940. The queue manager 922 handles queue requests for downloading content, as opposed to requests for retrieving content from storage for playback.

Figure 10:
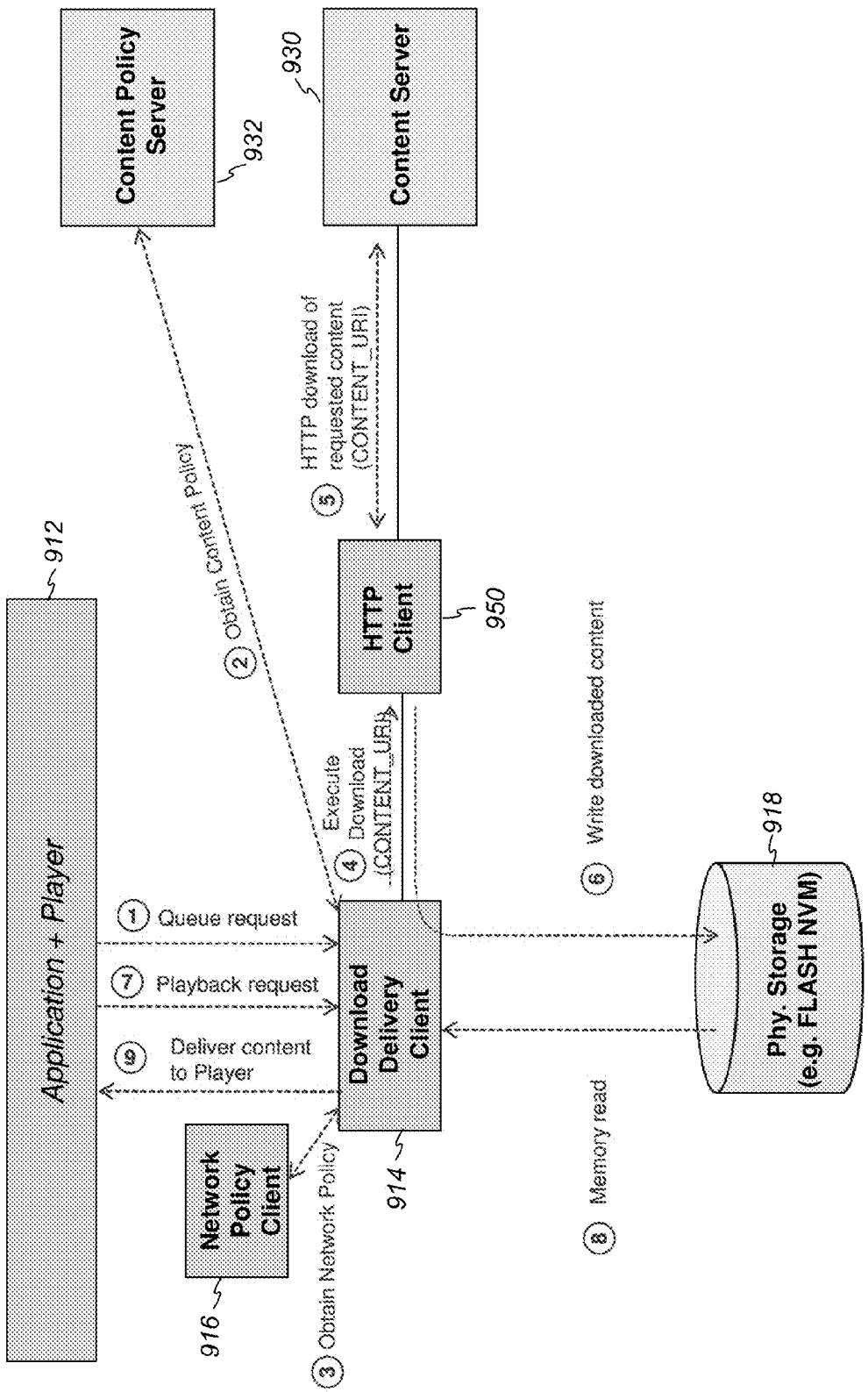
FIG. 10 provides a call flow diagram for queued request for unicast download delivery.

Nominal unicast download delivery of contents in P2200 is shown in FIG. 10, which shows the architecture and call flow for normal queue-requests for content, for which the P2200 client expects to be delivered over via unicast network, because there is no broadcast delivery service and associated delivery schedule indicating broadcast as alternative delivery mode. Should the requested content be determined to be available for scheduled delivery over a broadcast network (e.g., a cellular MBMS network), the download delivery client 914 may decide to instead acquire that content via broadcast download reception. In related aspects, such broadcast delivery capability and associated procedures permits predictive download of content items—i.e., contents deemed to be of likely interest to the user for future consumption (e.g., based on predictive analysis of past usage behavior, demographics information, user preference settings, etc.).

With continued reference to the example of FIG. 10, there is shown a local application+player 912, which is a local application group together with a media player. It is noted that the local application, which generates the initial queue request for content, may be separate from the media player, used for playback of the downloaded/cashed content. The local application+player 912 may send a queue request for a given content to the download delivery client 914, which in turn may obtain the content policy from a content policy server 932 or the like. The download delivery client 914 may obtain the network policy from a network policy client 916 or the like. The download delivery client 914 may then execute download of the given content (e.g., identified by a Content-URI or the like) by communicating with an HTTP client 950. The HTTP client 950 may communicate with the content server 930 to perform download of the given requested content from the content server 930. The download delivery client 914 may store the downloaded content in the storage 918 (e.g., flash non-volatile memory). The application+player 912 may send a playback request to the download delivery client 914, which in turn may read and obtain the stored content from the storage 918. The download delivery client 914 may deliver then stored content to the application+player 912. At the application+player 912, a forward error correction (FEC) decoder may be used on the delivered content for random access playback. For example, the stored content may be retrieved from FLASH memory and FEC decoded on the spot for trick-mode based playback (e.g., fast forward, rewind, etc.)

Figure 11:
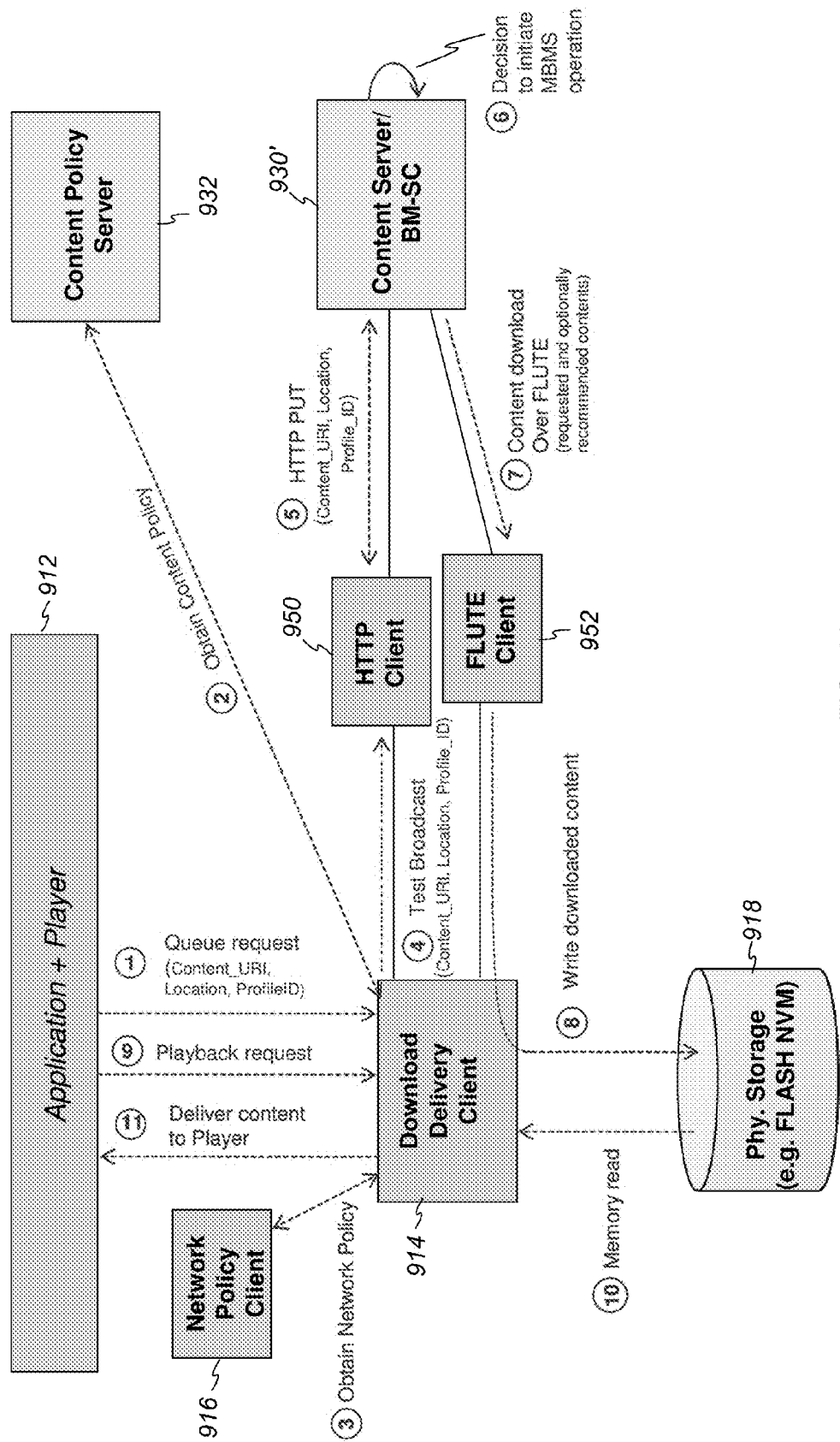
FIG. 11 provides a call flow diagram for on-demand MBMS substitution.

In further related aspects, there is described a scenario where the following three conditions are met in the P2200 context. With reference to FIG. 11, the first condition may be that a queue request (from the application+player 912 to the download delivery client 914) contains, in addition to the sought content item (e.g., as identified by a Content-URI or the like), location information of the UE, and/or a Profile-ID or the like. The location information may correspond to the present location of the UE (e.g., determined from a Cell ID, GPS latitude/longitude coordinates, or the like). The Profile-ID may be an alias associated with the end user, which the UE has previously obtained from the content server/BM-SC 930', for use in identifying the user in the selection and delivery of content item(s) deemed to be of potential interest to the user for future consumption. In the event the download delivery client 914 finds that the queue request contains location information and/or the Profile-ID, it may immediately send that request along with the location information and the Profile-ID to the content server/BM-SC 930' (e.g., via HTTP POST or PUT operations), over a D1-Unicast interface or the like. The second condition may be that the content server/BM-SC 930', which may include or have linkage to the MBMS BM-SC, detects a certain threshold number of such requests (the threshold value may be settable and controlled by the content/service provider) from users located within a certain suitable proximity to each another. Such proximity could be defined as the coverage area of multiple eNB's that includes an MBSFN. The third condition may be that the mobile operator's MBMS network can be activated on demand. In other words, the MBMS network may be capable of scheduling and broadcasting contents on a dynamic, as-needed basis. With respect to the content server/BM-SC 930', it is noted that the content server may be linked to or co-located with the BM-SC. For example, the decision to initiate MBMS operation may be made at the content server/BM-SC 930', a stand-alone BM-SC, or a stand-alone content server. It is also noted that the content server/BM-SC 930' may be in operative communication with the HTTP client 950 and/or the FLUTE client 952, each of which may be in operative communication with the download delivery client 914.

With continued reference to FIG. 11, the MBMS network may become activated, and one or more content items as commonly requested by the P2200 users may be scheduled for broadcast download delivery. In addition to delivery of those explicitly requested contents, should the Profile-IDs submitted to the content server 930' indicate similar interests among those users, recommended content(s) may also be included in the scheduled broadcast transmission. For example, the delivered contents over MBMS may include both program(s) commonly requested by multiple users, and recommended content(s) that fit the associated user profiles. Such auxiliary contents delivered to the user, besides those media contents predicted to meet user interests, may also include advertisements deemed suitable based on user interests, location, or the like, or combinations of such factors. Such on-demand broadcast substitution for unicast queued download would be beneficial. For example, the benefits may include: (i) relieving potential unicast network congestion due to simultaneous users requesting the same content(s) from the same proximity area; (ii) adjusting the content quality (e.g., resolution) based on the available throughput; and (iii) presenting a new, on-demand based usage model for MBMS services.

In accordance with aspects of the embodiments described herein, two other envisioned enhancements to unicast download delivery of Dynamic Adaptive Streaming over HTTP (DASH)-formatted contents are described below. The first enhancement pertains to policy-driven content downloading, when a time-based download policy may be in effect. For example, the mobile network operator may restrict execution of content download over 3G/4G unicast network to occur at specified time period(s). Even though deferred downloading, such as that implemented according to the IEEE P2200 standard, is typically executed during off-peak traffic hours (e.g., overnight), there may still arise situations of unpredictable network throughput which dynamically decreases the download data rate. In such event, the user may elect to define local usage policy that overrides nominal content policy.

For example, under normal conditions, the desired resolution of the video content requires retrieving a Representation whose bandwidth is specified to be 500 kbps. Assume, for example, that the first half of this content is obtained at this rate or higher, but then the average available download bandwidth rate drops to 220 kbps. At this download rate, the download time would prevent obtaining the remainder of the content that could not be obtained within the timeframe for displaying the content. In anticipation of such event, the user may elect, a priori, to allow the DASH Client to switch to a lower rate Representation, for example corresponding to required bandwidth of 200 kbps. In other words, the user may be willing to trade off (partially) lower resolution to receive the complete content as opposed to incomplete reception of the content at the higher resolution. In this case, and using P2200 as an example, the queue request may include an alternative bandwidth parameter, such as REQPROP-ALTERNATIVEBANDWIDTH or the like. This field may define an alternative, minimum data rate for content download that the user is willing to accept. To enable such Representation switching, the download delivery client (e.g., P2200 Client) may have access to a Connection Manager entity in the Client Device.

For example, the Connection Manager is assumed to expose an API to allow the download delivery client to determine the instantaneous and/or average available bandwidth on the unicast cellular network. Based on knowledge of the available network bandwidth, as well as a remaining download time window, the download delivery client may determine, via internal computation, which Representation to select, and ramp up or down accordingly to enable the highest possible resolution over time to be acquired, as well as facilitate best-effort content reception in its entirety. In other words, depending on the value of REQPROP-ALTERNATIVEBANDWIDTH, the available network bandwidth might be insufficient to allow the entire content to be downloaded within the available reception time window, as determined by the network policy and/or content policy. Furthermore, the Connection Manager may be capable of informing the download delivery client of available bandwidth on multiple access technologies available concurrently to the Client Device, such as WiFi and cellular. Assuming no conflicts with network policy that may dictate the access technology to/not to use, the download delivery client may be configured to switch to a different access technology in order to maximize the overall download speed, and optimize overall service quality.

In the same manner, should the download delivery client determine that a higher available data rate than the one requested or initially started with, the download delivery client may also increase the download data rate to obtain a correspondingly higher quality representation for some playback time. The upper limit of the download rate may be bound by a policy rule RULE_BANDWIDTH_LIMIT or the like set by the network provider, if any.

With regard to the above procedure, the download delivery client (e.g., P2200 Client) might choose to not only use the information in the media presentation description (MPD) for the selection of the bandwidth, but also the information available in the Segment Index of a Representation, as for example offered in the ISO BMFF (ISO Base Media File Format) based DASH On-Demand profile as defined in ISO/IEC 23009-1. Such a Segment index provides an exact time-byte range mapping and permits a better scheduling of the download as more detailed information is available. The download delivery client may for example decide to download higher bitrate parts of a Representation first, followed by the lower bitrate parts of that Representation.

In another scenario, the content may be offered such that individual media components (e.g., video, audio, subtitles, etc.) are accessible individually. In addition each of the media components may be available in different roles. Example roles may include: the language of the audio (e.g., available in English, French, or German); video in a 2D and 3D version with a stereoscopic formats; audio as original or dubbed version; subtitles (e.g., in Chinese or Japanese); different content protection schemes; support for accessibility rating restrictions; etc.

The download delivery client may download only certain media types, for example, it may download no subtitles, but only audio and video. It may also download exactly one role of each media type, for example, only the English audio track based on user preferences for 2D video. It may also download different roles for each media type, for example in anticipation of a user who wants to view the content once in a while in the original English language and once in a while in the German dubbed version. It may also download different qualities for the same media type, but different roles, for example the high quality English audio track and a low quality German audio track.

Generally, the download delivery client may use an MPD, user preferences, device capabilities, and other environmental information to select different Adaptation Sets and within each Adaptation Set one or several Representation based on such external information and some knowledge on the available bandwidth and the granted download time.

In related aspects, the second enhancement pertains to modifying the DASH MPD to signify the source of the content for retrieval and playback, upon the content having been downloaded and cached on the UE. The UE may do so in numerous ways, including two approaches described herein. In a first approach, the UE may rewrite the original MPD such that a new MPD is made available to the local DASH Client and media player. This new MPD describes the Representation(s) available on the UE for local retrieval and playback. The MPD may describe one or more Representations which belong to a single Adaptation Set or multiple Adaptation Sets, the composition of which is unchanged over the lifetime of the Media Presentation. Alternatively, the available Representations could vary over time, at the Period level of the Media Presentation. For example, as described previously, different Representations may be retrieved from the network-based DASH Server over time, due to network throughput fluctuations.

In a second approach, the modified MPD may include a combination of the original MPD corresponding to content accessible from the DASH Server on the network, and a new MPD entry describing the content/Representation(s) cached on the user device. The original and new MPD entries are appropriately marked so that the local DASH Client can select the appropriate Representation(s) without ambiguity. The attribute "serviceLocation" or the like of the MPD may be utilized to identify the locally-accessible content. For example, the string value of this attribute may be set to "localhost" to denote that the content described by this MPD is locally stored on the UE. An advantage of retaining the original MPD in the modified MPD is to allow additional access to resources on the network where such resources are available.

For example, when choosing to playback the locally stored content on the Media Player, the user may be joined by a friend who speaks a different language. In this situation, it would be desirable for a different subtitle track for the content to also be acquired, so that both persons can consume the content together. Another benefit for maintaining separate MPD entries, corresponding to network-based versus locally stored contents, may be to support playback policies of content providers. For example, a movie studio content provider might require a certain sequencing of content playback, and may mandate that certain movie previews, merchandize advertisements, and terms of use announcement always be played before the movie—the latter for which it might allow random access/trick mode viewing under user control. Furthermore, at the completion of the movie, the content provider may require a certain epilogue video or text to be displayed prior to termination of the overall viewing. Some of these required media components for rendering may not be previously downloaded and locally stored, and should be additionally retrieved, possibly with high priority (e.g., causing REQPROP-IMMEDIATE or the like to be set in a P2200 queue request to signal urgent download request) before content rendering can commence, to fulfill such content provider policy. In related aspects, specific signaling may be implemented to provide information regarding which segment, sub-segment, or time that the Representation is available at a given service location.

Methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 14A:
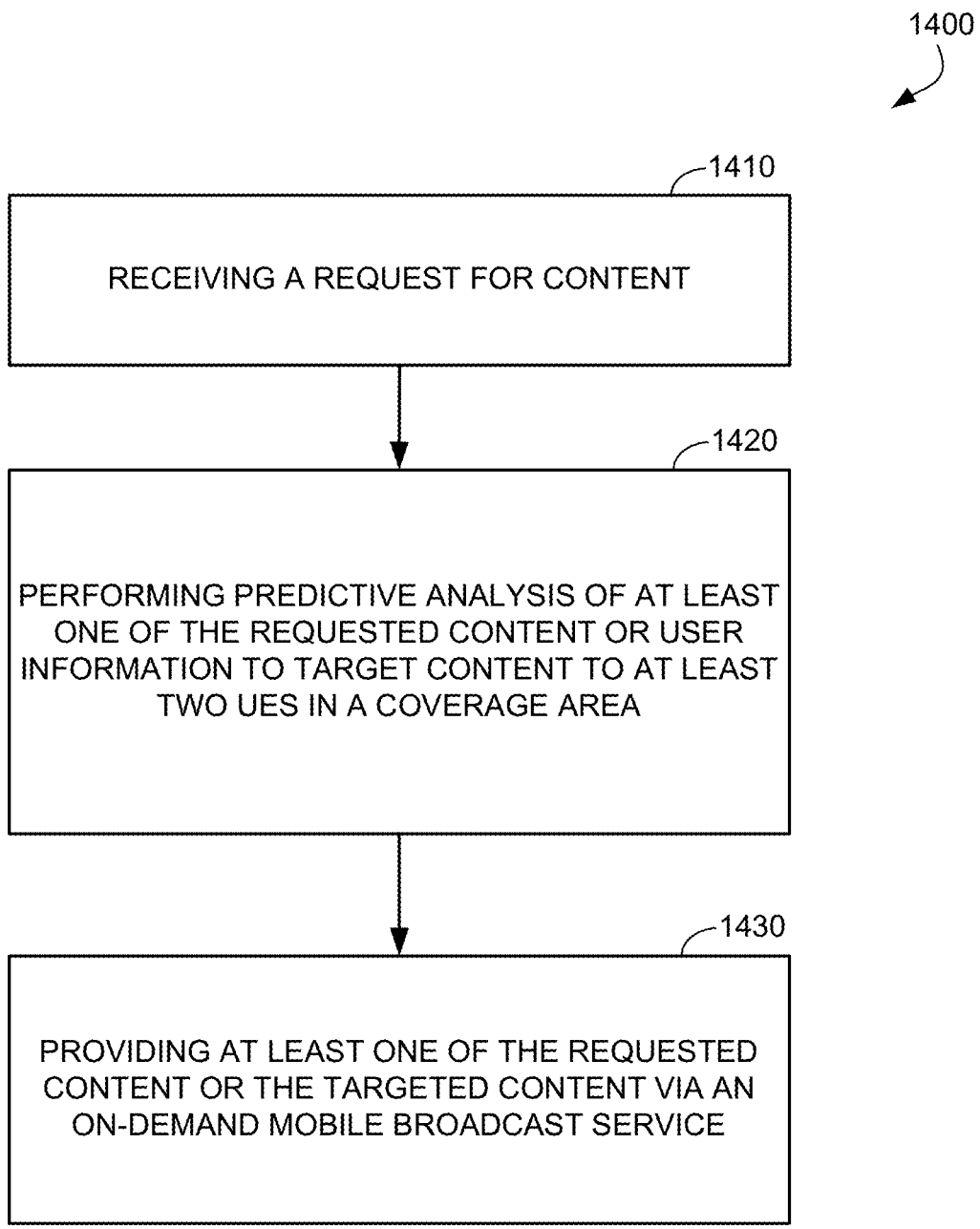

In general, on-demand broadcast and/or unicast content downloading methodologies described herein may be implemented using one or more of the features shown and described in connection with FIGS. 6A-B and 9-11, or variations thereof. In accordance with one or more aspects of the embodiments described herein, with reference to FIG. 14A, there is shown a content delivery methodology 1400, operable by a network entity (e.g., a BM-SC or the like) involving on-demand mobile broadcast service. The method 1400 may involve, at 1410, receiving a request for content. The method 1400 may involve, at 1420, performing predictive analysis of at least one of the requested content or user information to target content to at least two UEs in a coverage area. The method 1400 may involve, at 1430, providing at least one of the requested content or the targeted content via an on-demand mobile broadcast service.

With reference to FIG. 14B, there are shown further operations or aspects of the method 1400 that are optional and may be performed by a network entity or the like. If the method 1400 includes at least one block of FIG. 14B, then the method 1400 may terminate after the at least one block, without necessarily having to include any subsequent downstream block(s) that may be illustrated. It is further noted that numbers of the blocks do not imply a particular order in which the blocks may be performed according to the method 1400. For example, the method 1400 may further involve providing the requested content via the broadcast service, in response to a group interest in the requested content exceeding a threshold interest level (block 1430). In the alternative, or in addition, the method may involve providing the targeted content via the broadcast service, in response to a group interest in the targeted content exceeding a threshold interest level. (block 1432).

The user information may include at least one of user location or user profile data (block 1440). The user profile data may include at least one of past usage behavior, demographics information, user preference settings, or a profile-ID (block 1442). In related aspects, the targeted content may include at least one of supplemental content related to the requested content, targeted advertising, targeted coupons, targeted promotions, user-location based alerts or notifications (block 1450). In further related aspects, the method 1400 may further involve initially operating in unicast mode of operation (block 1460), and switching from the unicast mode of operation, in response to a group interest in at least one of the requested content or the targeted content exceeding a threshold interest level (block 1462).

Figure 15:
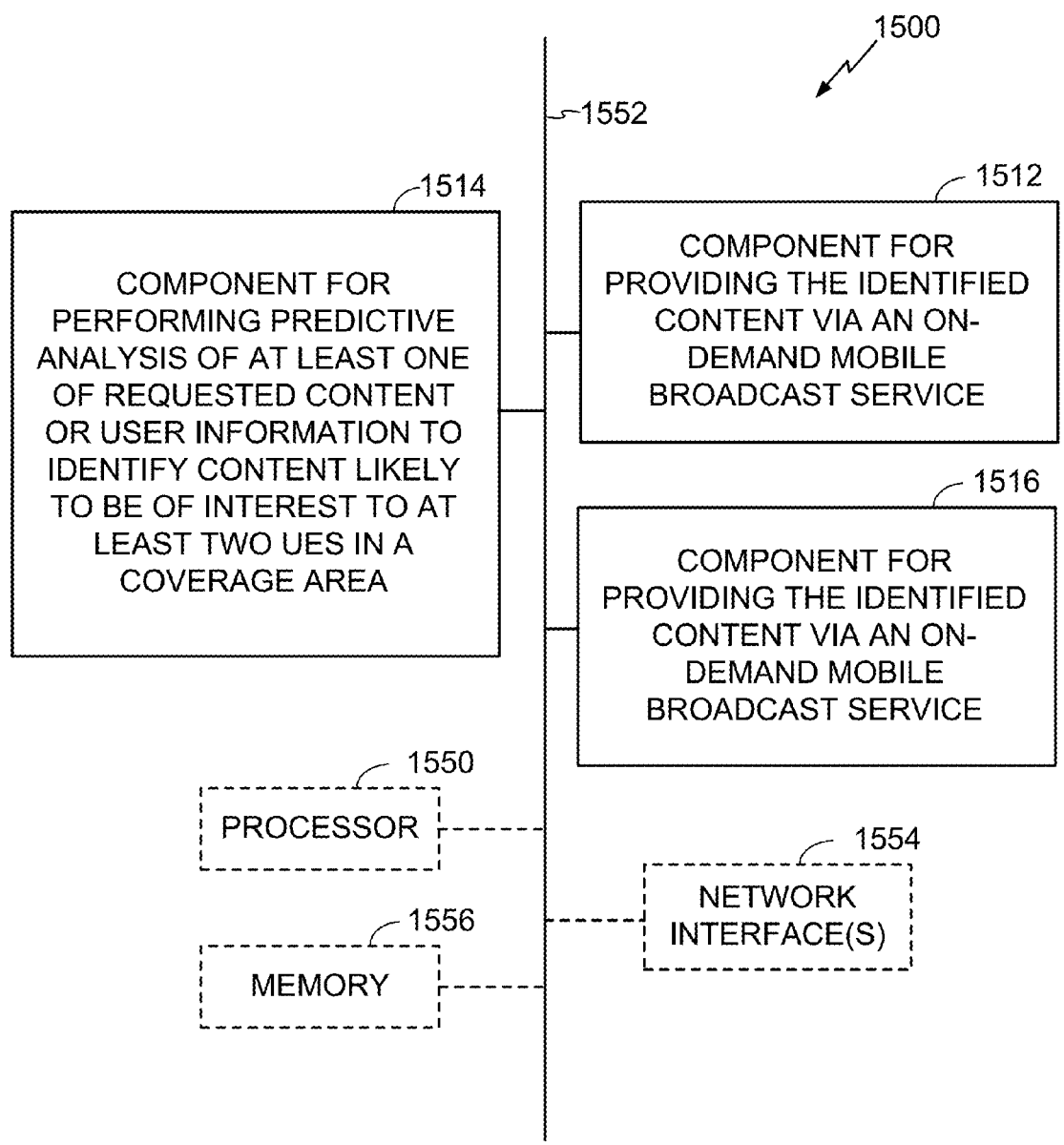
FIG. 15 shows an embodiment of an apparatus for on-demand broadcast content delivery, in accordance with the methodology of FIGS. 14A-B.

In accordance with one or more aspects of the embodiments described herein, there are provided devices and apparatuses for content delivery, as described above with reference to FIGS. 14A-B. With reference to FIG. 15, there is provided an exemplary apparatus 1500 that may be configured as a network entity (e.g., a stand-alone BM-SC or a BM-SC co-located with a content server) in a wireless network, or as a processor or similar device/component for use within the network entity. The apparatus 1500 may include functional blocks that can represent functions implemented by a processor, software, or combination thereof (e.g., firmware).

For example, apparatus 1500 may include an electrical component or module 1512 for receiving a request for content. For example, the electrical component 1512 may include the PDW GW interface 650 and/or the MBMS GW interface 652 working in conjunction with a receiver component or the like.

The apparatus 1500 may also include a component 1514 for performing predictive analysis of at least one of the requested content or user information to target content to at least two UEs in a coverage area. For example, the electrical component 1514 may include the MBMS session/transmission processor 662 and the controller 670 working in conjunction with the membership processor 660, the PDW GW interface 650, and the MBMS GW interface 652, as shown in FIG. 6B. The MBMS session/transmission processor 662 and the controller 670 may perform an algorithm that includes, among other things: receiving and decoding the content request message that includes the CONTENT_URI, location, Profile_ID, or the like; consulting the memory 672 to cross-reference the received data with known values or tables; and identifying content with a high probability be being of interest to the user (e.g. exceeding a defined interest threshold value), in accordance with the processes of FIGS. 14A-B or variations thereof. For example, a prediction or recommendation application/engine may be built directly into the BM-SC, or located externally with which the BM-SC interface(s), to determine how many users (e.g., 'x') of a given profile type (e.g., Profile_A) are making queue requests for content. If 'x' is above a preset threshold (e.g., set by operator policy or the like), the prediction/recommendation application may decide that broadcast delivery of predicted content for those Profile_A users is warranted.

The apparatus 1500 may also include a component 1516 for providing at least one of the requested content or the targeted content via an on-demand mobile broadcast service. For example, the electrical component 1516 may include the content provider interface 654 and the controller 670 of FIG. 6B communicating with a content server (e.g., content servers 930 in FIGS. 9-11), as well as the PDW GW interface 650 and the MBMS GW interface 652 for communicating with a download delivery client of a UE (e.g., the P2200 client in FIGS. 9-11). The content provider interface 654 and the controller 670 may perform an algorithm that includes, among other things: making a decision to initiate MBMS operation; and providing content download over FLUTE and/or via HTTP PUT, in accordance with the processes of FIGS. 14A-B or variations thereof. For example, a content provider, possibly working in conjunction with the MBMS operator, may operate a prediction/recommendation application or engine that determines that when some number 'n' or more users are requesting the same content, to make that content available for MBMS download delivery.

In related aspects, the apparatus 1500 may optionally include a processor component 1550 having at least one processor, in the case of the apparatus 1500 configured as a network entity rather than as a processor. The processor 1550, in such case, may be in operative communication with the components 1512-1516 via a bus 1552 or similar communication coupling or wireless communication channel. The processor 1550 may effect initiation and scheduling of the processes or functions performed by electrical components 1512-1516.

In further related aspects, the apparatus 1500 may include one or more network interface(s) 1554 for connecting to one or more other network entities. The apparatus may include a radio transceiver component (not shown). The apparatus 1500 may optionally include a component for storing information, such as, for example, a memory device/component 1556. The computer readable medium or the memory component 1556 may be operatively coupled to the other components of the apparatus 1500 via the bus 1552 or the like. The memory component 1556 may be adapted to store computer readable instructions and data for effecting the processes and behavior of the components 1512-1516, and subcomponents thereof, or the processor 1550, or the methods disclosed herein. The memory component 1556 may retain instructions for executing functions associated with the components 1512-1516. While shown as being external to the memory 1556, it is to be understood that the components 1512-1516 can exist within the memory 1556. It is further noted that the components in FIG. 15 may comprise processors, electronic devices, hardware devices, electronic sub-components, logical circuits, memories, software codes, firmware codes, etc., or any combination thereof.

Figure 12A:
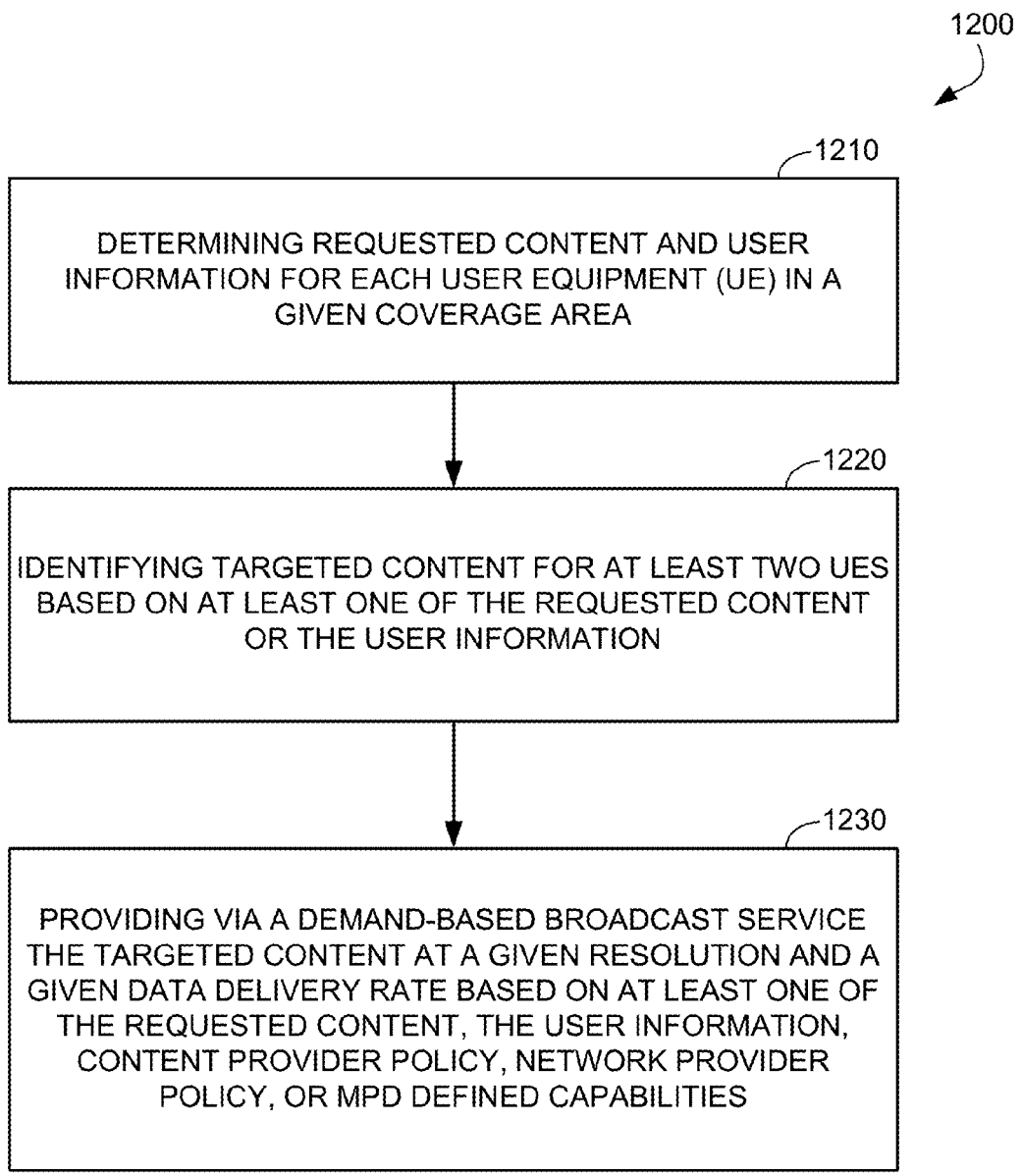
FIGS. 12A-B illustrate an example methodology executable by a network entity (e.g., BM-SC or the like) for unicast content delivery.

In accordance with one or more aspects of the embodiments described herein, with reference to FIG. 12A, there is shown another example of a content delivery methodology 1200, operable by a network entity, such as, for example, a BM-SC, a BM-SC co-located with a content server, or the like. For example, the method 1200 may involve, at 1210, determining requested content and user information for each user equipment (UE) in a given coverage area. The method 1200 may involve, at 1220, identifying targeted content for at least two UEs based on at least one of the requested content or the user information. The method 1200 may involve, at 1230, providing via a demand-based broadcast service the targeted content at a given resolution and a given data delivery rate based on at least one of the requested content, the user information, content provider policy, network provider policy, or MPD defined capabilities.

Figure 12B:
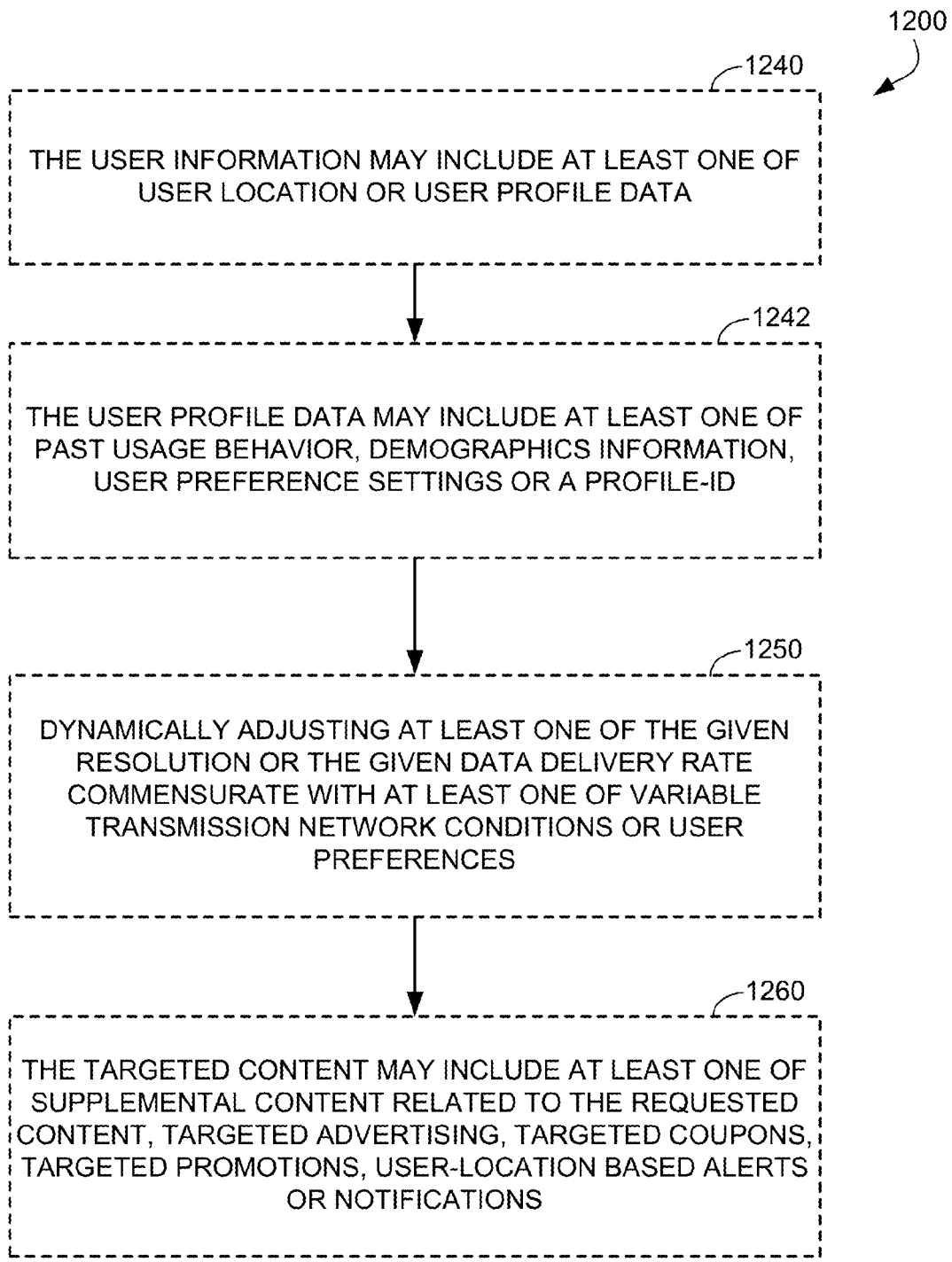

With reference to FIG. 12B, there are shown further operations or aspects of the method 1200 that are optional and may be performed by a network entity or the like. If the method 1200 includes at least one block of FIG. 12B, then the method 1200 may terminate after the at least one block, without necessarily having to include any subsequent downstream block(s) that may be illustrated. It is further noted that numbers of the blocks do not imply a particular order in which the blocks may be performed according to the method 1200. For example, the user information may include at least one of user location or user profile data (block 1240). The user profile data may include at least one of past usage behavior, demographics information, user preference settings or a profile-ID (block 1242).

In related aspects, the method 1200 may further involve dynamically adjusting at least one of the given resolution or the given data delivery rate commensurate with at least one of variable transmission network conditions or user preferences (block 1250). In further related aspects, the targeted content may include at least one of supplemental content related to the requested content, targeted advertising, targeted coupons, targeted promotions, user-location based alerts or notifications (block 1260).

Figure 13:
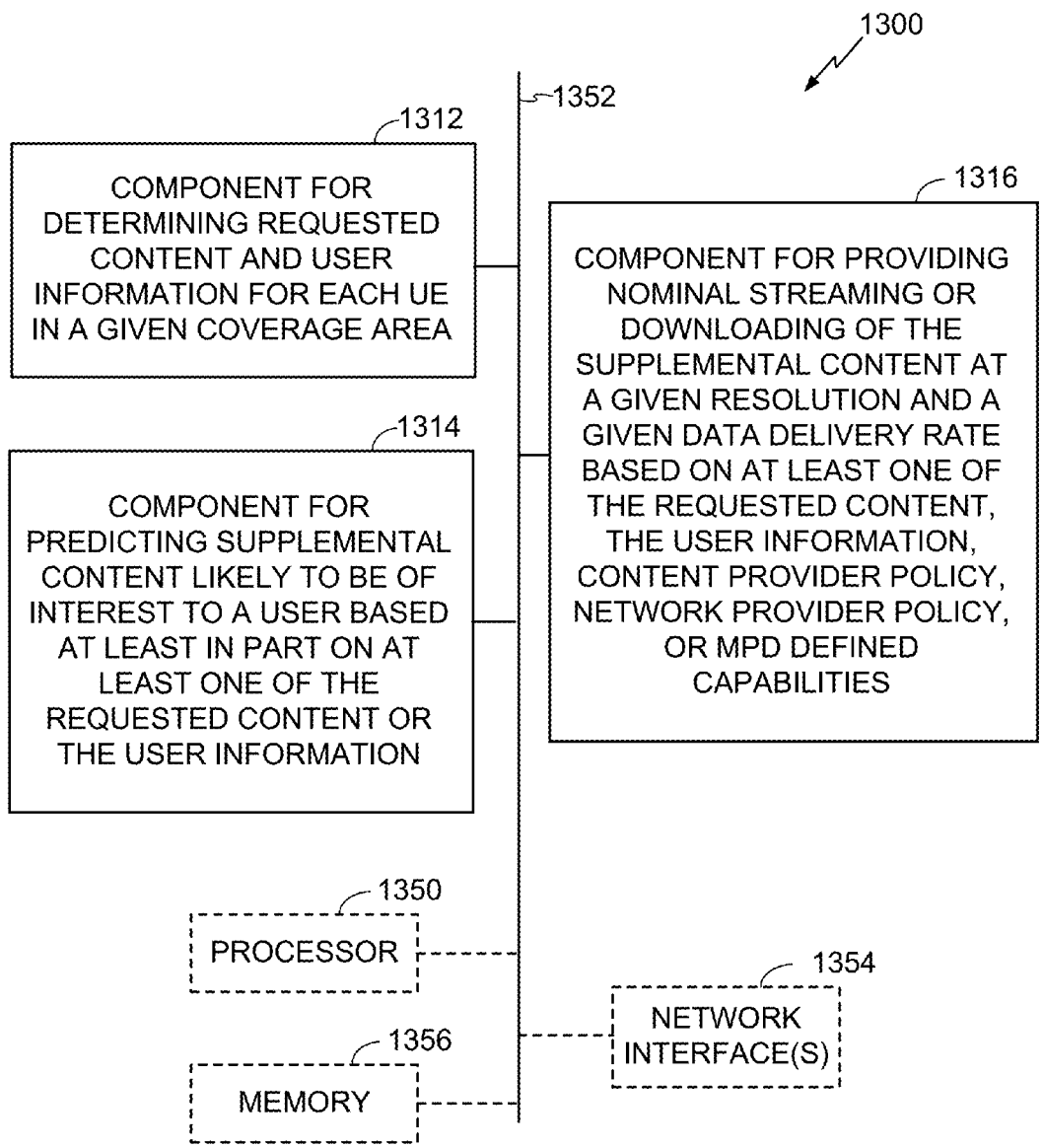
FIG. 13 shows an embodiment of an apparatus for unicast content delivery, in accordance with the methodology of FIGS. 12A-B.

In accordance with one or more aspects of the embodiments described herein, FIG. 13 shows a design of an apparatus 1300 (e.g., a network entity or component(s) thereof) for content delivery, as described above with reference to FIGS. 12A-B. For example, the apparatus 1300 may include an electrical component or module 1312 for determining requested content and user information for each user equipment (UE) in a given coverage area. For example, the electrical component 1312 may include the membership processor 660, the MBMS session/transmission processor 662, and the controller 670 working in conjunction with the PDW GW interface 650 and the MBMS GW interface 652, as shown in FIG. 6B. The membership processor 660 and the MBMS session/transmission processor 662 may perform an algorithm that includes, among other things: receiving and decoding the requested content and the user information for each UE; and examining the CONTENT_URI, location, Profile_ID, or the like in the received data, in accordance with the processes of FIGS. 12A-B or variations thereof.

The apparatus 1300 may include a component 1314 for identifying targeted content for at least two UEs based on at least one of the requested content or the user information. For example, the electrical component 1314 may include the MBMS session/transmission processor 662 and the controller 670 of FIG. 6B. The MBMS session/transmission processor 662 and the controller 670 may perform an algorithm that includes, among other things: consulting the memory 672 to cross-reference the received data with known values or tables; and identifying the supplemental content with a high probability be being of interest to the user (e.g. exceeding a defined interest threshold value), in accordance with the processes of FIGS. 12A-B or variations thereof. In another example, the component 1314 may include a High Request Rate Detector (HRRD) application or module. The HRRD may be configured to assess whether content would be more efficiently delivered via broadcast, and interacts with the BM-SC to indicate request for setting up dynamic MBMS delivery. In the alternative, the HRRD application or module may be outside but in operative communication with the BM-SC.

The apparatus 1300 may include a component 1316 for providing via a demand-based broadcast service the targeted content at a given resolution and a given data delivery rate based on at least one of the requested content, the user information, content provider policy, network provider policy, or MPD defined capabilities. For example, the electrical component 1316 may include the content provider interface 654 and the controller 670 of FIG. 6B communicating with a content server (e.g., content servers 930 in FIGS. 9-11), as well as the PDW GW interface 650 and the MBMS GW interface 652 for communicating with a download delivery client of a UE (e.g., the P2200 client in FIGS. 9-11). The content provider interface 654 and the controller 670 may perform an algorithm that includes, among other things: making a decision to initiate MBMS operation; and providing content download over FLUTE and/or via HTTP PUT, in accordance with the processes of FIGS. 12A-B or variations thereof.

For the sake of conciseness, the rest of the details regarding apparatus 1300 are not further elaborated on; however, it is to be understood that the remaining features and aspects of the apparatus 1300 are substantially similar to those described above with respect to apparatus 1500 of FIG. 15.

Figure 16A:
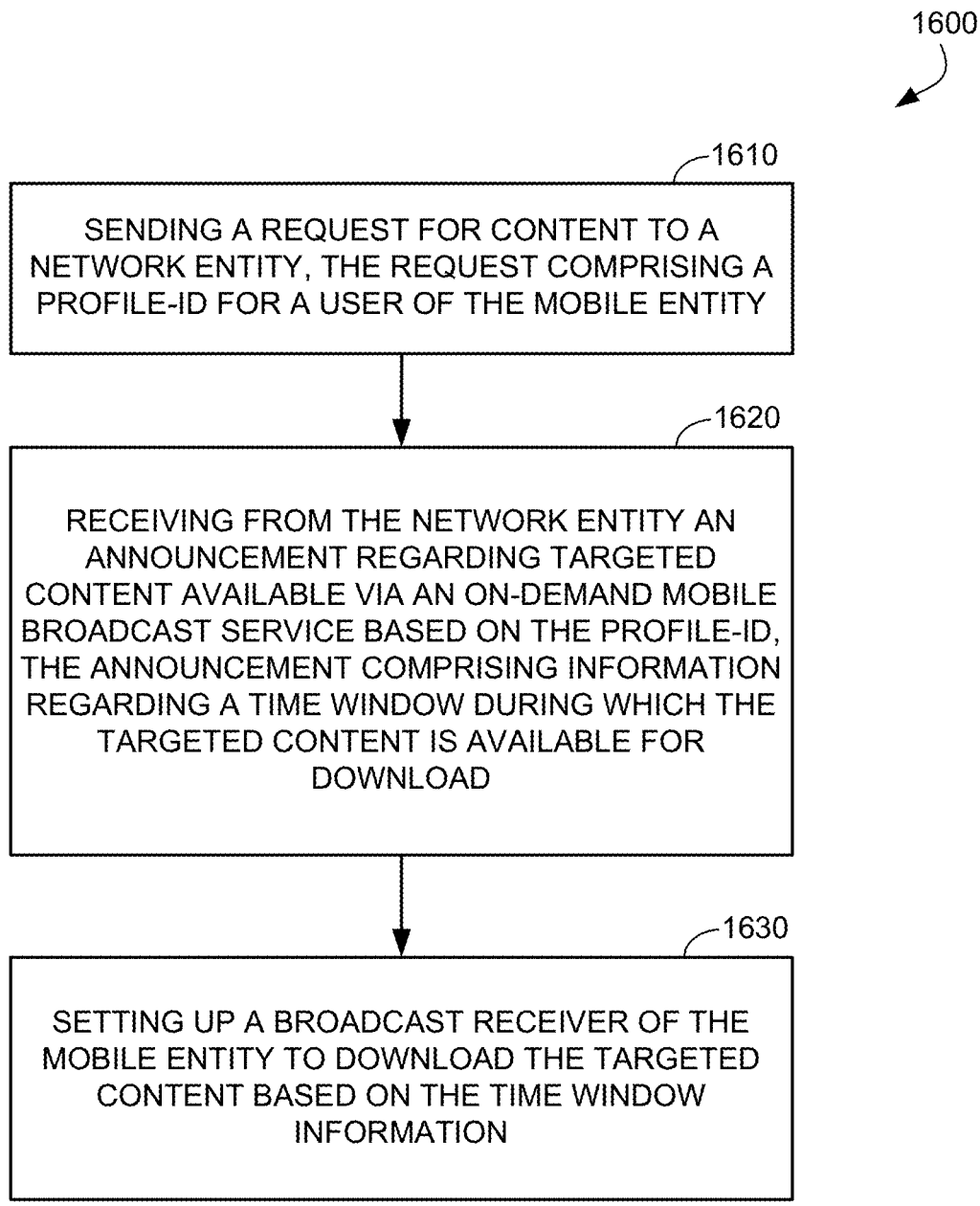
FIGS. 16A-B illustrate an methodology executable by a mobile entity (e.g., UE or the like) for on-demand broadcast content delivery.

In accordance with one or more aspects of the embodiments described herein, with reference to FIG. 16A, there is shown another example of a content delivery methodology 1600, operable by a mobile entity, such as, for example, a UE or the like. For example, the method 1600 may involve, at 1610, sending a request for content to a network entity, the request comprising a profile-ID for a user of the mobile entity. The method may involve, at 1620, receiving from the network entity an announcement regarding targeted content available via an on-demand mobile broadcast service based on the profile-ID, the announcement comprising information regarding a time window during which the targeted content is available for download. The method may involve, at 1630, setting up a broadcast receiver of the mobile entity to download the targeted content based on the time window information.

Figure 16B:
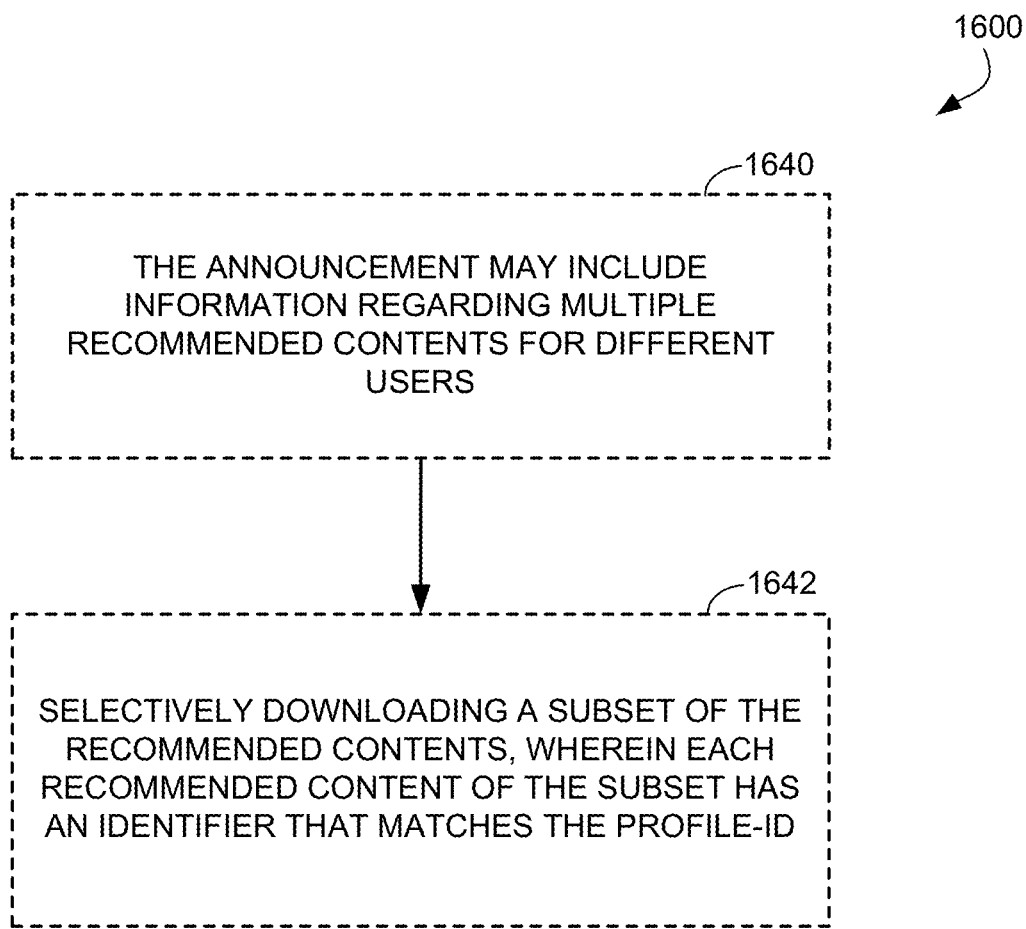

With reference to FIG. 16B, there are shown further operations or aspects of the method 1600 that are optional and may be performed by a network entity or the like. If the method 1600 includes at least one block of FIG. 16B, then the method 1600 may terminate after the at least one block, without necessarily having to include any subsequent downstream block(s) that may be illustrated. It is further noted that numbers of the blocks do not imply a particular order in which the blocks may be performed according to the method 1600. For example, the announcement may include information regarding multiple recommended contents for different users (block 1640). The method 1600 may further involve selectively downloading a subset of the recommended contents, wherein each recommended content of the subset has an identifier that matches the profile-ID or the like (block 1642).

Figure 17:
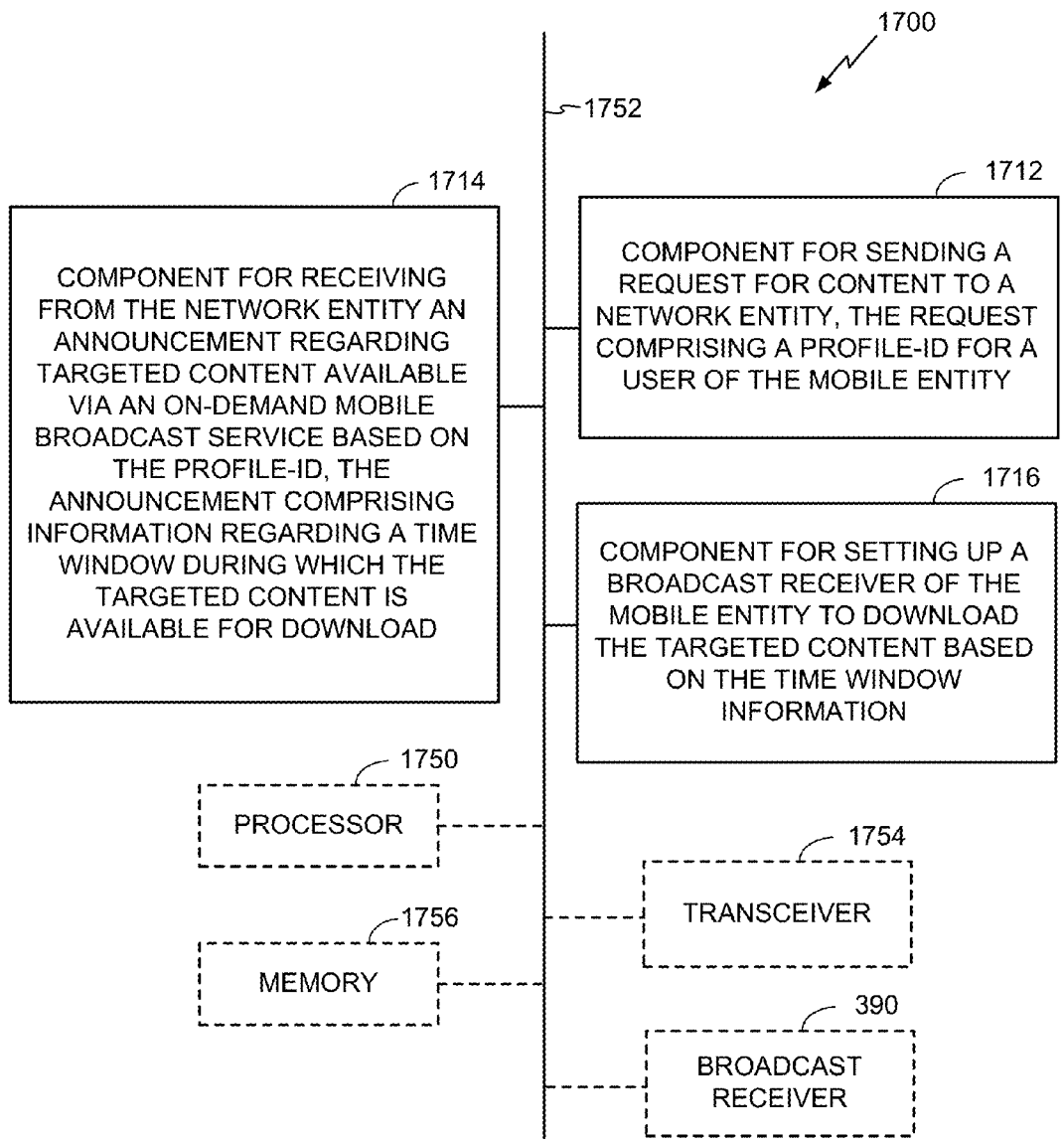
FIG. 17 shows an embodiment of an apparatus for on-demand broadcast content delivery, in accordance with the methodology of FIG. 16.

In accordance with one or more aspects of the embodiments described herein, FIG. 17 shows a design of an apparatus 1700 (e.g., a mobile entity or component(s) thereof) for content delivery, as described above with reference to FIGS. 16A-B. For example, the apparatus 1700 may include an electrical component or module 1712 for sending a request for content to a network entity, the request comprising a profile-ID for a user of the mobile entity. For example, the electrical component 1712 may include the transmit processor 364 and the TX MIMO processor 366 working in conjunction with the controller/processor 380, the memory 382, and the data source 362 shown in FIG. 3.

The apparatus 1700 may include an electrical component 1714 for receiving from the network entity an announcement regarding targeted content available via an on-demand mobile broadcast service based on the profile-ID, the announcement comprising information regarding a time window during which the targeted content is available for download. For example, the electrical component 1714 may include the MIMO detector 356, the receive processor 358, and the data sink 360 shown in FIG. 3.

The apparatus 1700 may include an electrical component 1716 for setting up a broadcast receiver of the mobile entity to download the targeted content based on the time window information. For example, the electrical component 1716 may include the controller/processor 380 working in conjunction with the broadcast receiver 390 shown in FIG. 3.

For the sake of conciseness, the rest of the details regarding apparatus 1700 are not further elaborated on; however, it is to be understood that the remaining features and aspects of the apparatus 1700 are similar to those described above with respect to apparatus 1500 of FIG. 15. It is noted, however, that the apparatus 1700 is a mobile entity, whereas the apparatus 1500 is a network entity. It is also noted that the apparatus 1700 includes a radio transceiver 1754 for radio communication with one or more mobile networks. The apparatus 1700 may further include a broadcast receiver 390.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A content delivery method operable by a network entity in a wireless communication system, comprising:
   receiving a request for content;
   identifying targeted content for different users of a group including at least two user equipments (UEs) in a coverage area of a cellular wireless communication system, based on a predictive analysis of at least one of the requested content or user information associated with the request for content; and
   providing the targeted content to the at least two UEs, the providing comprising:
      initially delivering the targeted content via a unicast service in the coverage area;
      determining that a predicted group interest in the targeted content for the group exceeds a threshold interest level; and
   ceasing delivery of the targeted content via the unicast service, and delivering the targeted content via an on-demand mobile broadcast service in the coverage area in response to the predicted group interest in the targeted content for the group exceeding the threshold interest level.

2. The method of claim 1, further comprising providing the requested content via the broadcast service, in response to a group interest in the requested content exceeding a threshold interest level.

3. The method of claim 1, wherein the user information comprises at least one of user location or user profile data.

4. The method of claim 3, wherein the user profile data comprises at least one of past usage behavior, demographics information, user preference settings, or a profile-ID.

5. The method of claim 1, wherein the targeted content comprises at least one of supplemental content related to the requested content, targeted advertising, targeted coupons, targeted promotions, user-location based alerts or notifications.

6. An apparatus, comprising:
at least one processor is configured to: receive a request for content; identifying targeted content for different users of a group including at least two user equipments (UEs) in a coverage area of a cellular wireless communication system, based on a predictive analysis of at least one of the requested content or user information associated with the request for content; provide the targeted content to the at least two UEs by initially delivering the targeted content via a unicast service in the coverage area; determine that a predicted group interest in the targeted content for the group exceeds a threshold interest level; cease delivery of the targeted content via the unicast service, and deliver the targeted content via an on-demand mobile broadcast service in the coverage area in response to the predicted group interest in the targeted content for the group exceeding the threshold interest level; and
a memory coupled to the at least one processor for storing data.

7. The apparatus of claim 6, wherein the at least one processor is further configured to provide the requested content via the broadcast service, in response to a group interest in the requested content exceeding a threshold interest level.

8. A non-transitory computer-readable medium, comprising code for:
receiving a request for content;
identifying targeted content for different users of a group including at least two user equipments (UEs) in a coverage area of a cellular wireless communication system, based on a predictive analysis of at least one of the requested content or user information associated with the request for content; and
providing the targeted content to the at least two UEs, the providing comprising:
initially delivering the targeted content via a unicast service in the coverage area;
determining that a predicted group interest in the targeted content for the group exceeds a threshold interest level; and
ceasing delivery of the targeted content via the unicast service, and delivering the targeted content via an on-demand mobile broadcast service in the coverage area in response to the predicted group interest in the targeted content for the group exceeding the threshold interest level.

9. A content delivery method operable by a network entity in a wireless communication system, comprising:
determining requested content and user information for each user equipment (UE) in a given coverage area of a demand-based broadcast service in a cellular wireless communication system;
identifying targeted content for different users of a group including at least two UEs in the coverage area, based on at least one of the requested content or the user information; and
initially providing for the at least two UEs via a unicast mode of operation, the targeted content at a given resolution and a given data delivery rate selected based on at least one of the requested content, the user information, content provider policy, network provider policy, or media presentation description (MPD) defined capabilities;
determining that a predicted group interest in the targeted content for the group exceeds a threshold interest level;
ceasing providing of the targeted content via the unicast mode of operation; and
providing for the at least two UEs, the targeted content via a broadcast mode of operation of the demand-based broadcast service.

10. The method of claim 9, wherein the user information comprises at least one of user location or user profile data.

11. The method of claim 10, wherein the user profile data comprises at least one of past usage behavior, demographics information, user preference settings or a profile-ID.

12. The method of claim 9, further comprising dynamically adjusting at least one of the given resolution or the given data delivery rate commensurate with at least one of variable transmission network conditions or user preference settings.

13. The method of claim 9, wherein the targeted content comprises at least one of supplemental content related to the requested content, targeted advertising, targeted coupons, targeted promotions, user-location based alerts or notifications.

14. An apparatus, comprising:
at least one processor is configured to: (a) determine requested content and user information for each user equipment (UE) in a given coverage area of a demand-based broadcast service in a cellular wireless communication system; (b) identify targeted content for different users of a group including at least two UEs in the coverage area, based on at least one of the requested content or the user information; (c) initially provide for the at least two UEs via a unicast mode of operation, the targeted content at a given resolution and a given data delivery rate selected based on at least one of the requested content, the user information, content provider policy, network provider policy, or media presentation description (MPD) defined capabilities; (d) determine that a predicted group interest in the targeted content for the group exceeds a threshold interest level; (e) cease to provide the targeted content via the unicast mode of operation; and (f) provide for the at least two UEs, the targeted content via a broadcast mode of operation of the demand-based broadcast service; and
a memory coupled to the at least one processor for storing data.

15. The apparatus of claim 14, wherein the at least one processor is further configured to dynamically adjust at least one of the given resolution or the given data delivery rate commensurate with at least one of variable transmission network conditions or user preference settings.

16. A non-transitory computer-readable medium, comprising code for:
determining requested content and user information for each user equipment (UE) in a given coverage area of a demand-based broadcast service in a cellular wireless communication system;
identifying targeted content for different users of a group including at least two UEs in the coverage area, based on at least one of the requested content or the user information; and
initially providing for the at least two UEs via a unicast mode of operation, the targeted content at a given resolution and a given data delivery rate selected based on at least one of the requested content, the user information, content provider policy, network provider policy, or media presentation description (MPD) defined capabilities;
determining that a predicted group interest in the targeted content for the group exceeds a threshold interest level;
ceasing providing of the targeted content via the unicast mode of operation; and providing for the at least two UEs, the targeted content via a broadcast mode of operation of the demand-based broadcast service.

17. A method operable by a mobile entity in a wireless communication system, comprising:
sending a request for content to a network entity, the request comprising a profile-ID for a user of the mobile entity;
receiving targeted content from the network entity via a unicast network based on the profile-ID;
receiving an announcement from the network entity that the targeted content is available via an on-demand mobile broadcast service in a coverage area of a cellular wireless network based on the profile-ID, the announcement comprising information regarding a time window during which the targeted content is available for download in the coverage area;
upon receiving the announcement, setting up a broadcast receiver of the mobile entity to download the targeted content using a broadcast mode of operation based on the time window and coverage area information; and
ceasing receiving the targeted content via the unicast network.

18. The method of claim 17, wherein:
the announcement comprises information regarding multiple recommended contents for different users; and
the method further comprises selectively downloading a subset of the recommended contents, wherein each recommended content of the subset has an identifier that matches the profile-ID.

19. The method of claim 17, wherein the profile-ID is based on at least one of user profile data, past usage behavior, demographics information, or user preference settings.

20. The method of claim 17, wherein the targeted content comprises at least one of supplemental content related to the requested content, targeted advertising, targeted coupons, targeted promotions, user-location based alerts or notifications.

21. An apparatus, comprising:
at least one processor is configured to: (a) send a request for content to a network entity, the request comprising a profile-ID for a user of a mobile entity; (b) receive targeted content from the network entity via a unicast network based on the profile-ID; (c) receive an announcement from the network entity that the targeted content is available via an on-demand mobile broadcast service in a coverage area of a cellular wireless network based on the profile-ID, the announcement comprising information regarding a time window during which the targeted content is available for download in the coverage area; (d) upon receiving the announcement, set up a broadcast receiver of the mobile entity to download the targeted content using a broadcast mode of operation based on the time window and coverage area information; and (e) cease receiving the targeted content via the unicast network; and
a memory coupled to the at least one processor for storing data.

22. The apparatus of claim 21, wherein:
the announcement comprises information regarding multiple recommended contents for different users; and
the at least one processor is further configured to selectively download a subset of the recommended contents, wherein each recommended content of the subset has an identifier that matches the profile-ID.

23. A non-transitory computer-readable medium comprising code for:
sending a request for content to a network entity, the request comprising a profile-ID for a user of a mobile entity;
receiving targeted content from the network entity via a unicast network based on the profile-ID;
receiving an announcement from the network entity that the targeted content available via an on-demand mobile broadcast service in a coverage area of a cellular wireless network based on the profile-ID, the announcement comprising information regarding a time window during which the targeted content is available for download in the coverage area;
upon receiving the announcement, setting up a broadcast receiver of the mobile entity to download the targeted content based on the time window and coverage area information; and
ceasing receiving the targeted content via the unicast network.

\* \* \* \* \*